US008238328B2

(12) United States Patent
Binder

(10) Patent No.: US 8,238,328 B2
(45) Date of Patent: Aug. 7, 2012

(54) TELEPHONE SYSTEM HAVING MULTIPLE DISTINCT SOURCES AND ACCESSORIES THEREFOR

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1638 days.

(21) Appl. No.: 11/636,998

(22) Filed: Dec. 12, 2006

(65) Prior Publication Data

US 2007/0086444 A1    Apr. 19, 2007

Related U.S. Application Data

(63) Continuation of application No. 10/492,411, filed as application No. PCT/IL2004/000178 on Feb. 24, 2004, now Pat. No. 7,746,905.

(30) Foreign Application Priority Data

Mar. 13, 2003   (IL) .......................................... 154921

(51) Int. Cl.
*H04L 12/56* (2006.01)
(52) U.S. Cl. ......................... 370/352; 370/338; 370/354
(58) Field of Classification Search .................. 370/338, 370/401, 352, 354; 725/78, 82, 111, 119
See application file for complete search history.

(56) References Cited

U.S. PATENT DOCUMENTS

| | | | |
|---|---|---|---|
| 2,264,395 A | 12/1941 | Mitchell | |
| 2,264,396 A | 12/1941 | Moore | |
| 2,298,435 A | 10/1942 | Tunick | |
| 2,510,273 A | 6/1950 | Barstow et al. | |
| 2,516,211 A | 7/1950 | Hochgraf | |
| 2,568,342 A | 9/1951 | Koehler et al. | |
| 3,280,259 A | 10/1966 | Cotter | |
| 3,366,744 A | 1/1968 | Miller | |
| 3,369,078 A | 2/1968 | Stradley | |

(Continued)

FOREIGN PATENT DOCUMENTS

WO    9623377 A1    8/1996

(Continued)

OTHER PUBLICATIONS

"Simple, High-Speed Ethernet Technology for the Home, A White Paper" The Home Phoneline Networking Alliance, Online! (Jun. 1998) pp. 1-11.

(Continued)

*Primary Examiner* — Yuwen Pan
*Assistant Examiner* — Yosef K Laekemariam
(74) *Attorney, Agent, or Firm* — Browdy and Neimark, PLLC

(57) ABSTRACT

In conjunction with a data communication network carrying multiple telephony signals and allowing for connection of telephone sets, a system and method in which two external feeders connect to the data network at two distinct points via two distinct devices. The data network can be based on dedicated wiring or can use existing in-premises medium such as telephone, powerlines or CATV wiring. In the latter case, the wiring can still carry the original service for which it was installed. The external telephone connections can be based on the traditional PSTN, CATV network, cellular telephone network or any other telephone service provider network, using specific adapter for any medium used. In the case of connection to a POTS telephone signal, VoIP gateway (or any other converter) is required.

40 Claims, 27 Drawing Sheets

U.S. PATENT DOCUMENTS

| | | |
|---|---|---|
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Hasselwood et al. |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,937,889 A | 2/1976 | Bell, III et al. |
| 3,949,172 A | 4/1976 | Brown et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,171,467 A | 10/1979 | Evenchik |
| 4,206,320 A | 6/1980 | Keasler et al. |
| 4,262,171 A | 4/1981 | Schneider et al. |
| 4,302,629 A | 11/1981 | Foulkes et al. |
| 4,303,993 A | 12/1981 | Panepinto, Jr. et al. |
| 4,328,579 A | 5/1982 | Hashimoto et al. |
| 4,330,687 A | 5/1982 | Foulkes et al. |
| 4,332,980 A | 6/1982 | Reynolds et al. |
| 4,335,464 A | 6/1982 | Armstrong et al. |
| 4,339,816 A | 7/1982 | Reed |
| 4,367,548 A | 1/1983 | Cotten, Jr. et al. |
| 4,378,470 A | 3/1983 | Murto et al. |
| 4,380,009 A | 4/1983 | Long et al. |
| 4,381,427 A | 4/1983 | Cheal et al. |
| 4,387,271 A | 6/1983 | Artom |
| 4,388,489 A | 6/1983 | Wigan et al. |
| 4,390,986 A | 6/1983 | Moses |
| 4,393,508 A | 7/1983 | Boudault |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,475,193 A | 10/1984 | Brown |
| 4,479,033 A | 10/1984 | Brown et al. |
| 4,485,400 A | 11/1984 | Lemelson et al. |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,793 A | 3/1985 | Adams |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,546,212 A | 10/1985 | Crowder, Sr. |
| 4,551,721 A | 11/1985 | Kozlik |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | ab der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,631,367 A | 12/1986 | Coviello et al. |
| 4,644,526 A | 2/1987 | Wu |
| 4,646,289 A | 2/1987 | Tsiakas et al. |
| 4,646,296 A | 2/1987 | Bartholet et al. |
| 4,647,725 A | 3/1987 | Dellinger et al. |
| 4,649,551 A | 3/1987 | Sander et al. |
| 4,656,655 A | 4/1987 | Hashimoto |
| 4,665,516 A | 5/1987 | Middleton et al. |
| 4,665,544 A | 5/1987 | Honda et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,701,945 A | 10/1987 | Pedigo |
| 4,703,499 A | 10/1987 | Fossas et al. |
| 4,709,412 A | 11/1987 | Seymour et al. |
| 4,731,821 A | 3/1988 | Jackson, III |
| 4,734,932 A | 3/1988 | Lott |
| 4,740,963 A | 4/1988 | Eckley |
| 4,748,656 A | 5/1988 | Gibbs et al. |
| 4,754,326 A | 6/1988 | Kram et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,843,606 A | 6/1989 | Bux et al. |
| 4,847,903 A | 7/1989 | Schotz |
| 4,849,811 A | 7/1989 | Kleinerman |
| 4,852,151 A | 7/1989 | Dittakavi et al. |
| 4,866,704 A | 9/1989 | Bergman |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,891,694 A | 1/1990 | Way |
| 4,893,326 A | 1/1990 | Duran et al. |
| 4,896,349 A | 1/1990 | Kubo et al. |
| 4,901,218 A | 2/1990 | Cornwell |
| 4,901,342 A | 2/1990 | Jones |
| 4,903,292 A | 2/1990 | Dillon |
| 4,914,688 A | 4/1990 | Kobayashi et al. |
| 4,918,688 A | 4/1990 | Krause et al. |
| 4,924,492 A | 5/1990 | Gitlin et al. |
| 4,932,022 A | 6/1990 | Keeney et al. |
| 4,932,047 A | 6/1990 | Emmons et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |
| 5,022,069 A | 6/1991 | Chen |
| 5,023,868 A | 6/1991 | Davidson et al. |
| 5,027,426 A | 6/1991 | Chiocca, Jr. |
| 5,034,948 A | 7/1991 | Mizutani et al. |
| 5,036,513 A | 7/1991 | Greenblatt |
| 5,042,028 A | 8/1991 | Ogawa |
| 5,051,822 A | 9/1991 | Rhoades |

| | | | | | | |
|---|---|---|---|---|---|---|
| 5,066,939 A | 11/1991 | Mansfield, Jr. | | 5,706,286 A * | 1/1998 | Reiman et al. ............. 370/401 |
| 5,070,522 A | 12/1991 | Nilssen | | 5,708,701 A | 1/1998 | Houvig et al. |
| 5,089,886 A | 2/1992 | Grandmougin | | 5,712,977 A | 1/1998 | Glad et al. |
| 5,090,052 A | 2/1992 | Nakajima et al. | | 5,729,824 A | 3/1998 | O'Neill et al. |
| 5,095,497 A | 3/1992 | Aman et al. | | 5,737,333 A | 4/1998 | Civanlar et al. |
| 5,111,497 A | 5/1992 | Bliven et al. | | 5,742,596 A | 4/1998 | Baratz et al. |
| 5,127,003 A | 6/1992 | Doll, Jr. et al. | | 5,751,701 A | 5/1998 | Langberg et al. |
| 5,140,630 A | 8/1992 | Fry et al. | | 5,754,539 A | 5/1998 | Metz et al. |
| 5,142,568 A | 8/1992 | Ogata et al. | | 5,756,280 A | 5/1998 | Soora et al. |
| 5,151,838 A | 9/1992 | Dockery | | 5,757,803 A | 5/1998 | Russell et al. |
| 5,247,347 A | 9/1993 | Litteral et al. | | 5,757,936 A | 5/1998 | Lee |
| 5,257,006 A | 10/1993 | Graham et al. | | 5,764,743 A | 6/1998 | Goedken et al. |
| 5,265,154 A | 11/1993 | Schotz | | 5,767,895 A | 6/1998 | Yashiro et al. |
| 5,274,631 A | 12/1993 | Bhardwaj | | 5,768,279 A | 6/1998 | Barn et al. |
| 5,283,637 A | 2/1994 | Goolcharan | | 5,771,236 A | 6/1998 | Sansom et al. |
| 5,283,825 A | 2/1994 | Druckman et al. | | 5,774,526 A | 6/1998 | Propp et al. |
| 5,305,312 A | 4/1994 | Fornek et al. | | 5,777,769 A | 7/1998 | Coutinho |
| 5,319,634 A | 6/1994 | Bartholomew et al. | | 5,778,303 A | 7/1998 | Shinozaki et al. |
| 5,341,415 A | 8/1994 | Baran | | 5,781,617 A | 7/1998 | McHale et al. |
| 5,345,437 A | 9/1994 | Ogawa | | 5,787,115 A | 7/1998 | Turnbull et al. |
| 5,353,334 A | 10/1994 | O'Sullivan | | 5,790,548 A | 8/1998 | Sistanizadeh et al. |
| 5,363,432 A | 11/1994 | Martin et al. | | 5,793,413 A | 8/1998 | Hylton et al. |
| 5,379,005 A | 1/1995 | Aden et al. | | 5,802,177 A | 9/1998 | Daniel et al. |
| 5,381,459 A | 1/1995 | Lappington | | 5,802,283 A | 9/1998 | Grady et al. |
| 5,381,462 A | 1/1995 | Larson et al. | | 5,805,591 A | 9/1998 | Naboulsi et al. |
| 5,408,260 A | 4/1995 | Arnon | | 5,809,033 A | 9/1998 | Turner et al. |
| 5,410,343 A | 4/1995 | Coddington et al. | | 5,809,431 A | 9/1998 | Bustamante et al. |
| 5,425,089 A | 6/1995 | Chan et al. | | 5,812,786 A | 9/1998 | Seazholtz et al. |
| 5,428,608 A | 6/1995 | Freeman et al. | | 5,822,374 A | 10/1998 | Levin |
| 5,440,335 A | 8/1995 | Beveridge | | 5,822,678 A | 10/1998 | Evanyk |
| 5,448,635 A | 9/1995 | Biehl et al. | | 5,826,196 A | 10/1998 | Cuthrell |
| 5,452,289 A | 9/1995 | Sharma et al. | | 5,828,821 A | 10/1998 | Hoshina et al. |
| 5,463,616 A | 10/1995 | Kruse et al. | | 5,832,057 A | 11/1998 | Furman |
| 5,479,447 A | 12/1995 | Chow et al. | | 5,838,777 A | 11/1998 | Chang et al. |
| 5,489,894 A | 2/1996 | Murray | | 5,841,360 A | 11/1998 | Binder |
| 5,499,241 A | 3/1996 | Thompson et al. | | 5,841,840 A | 11/1998 | Smith et al. |
| 5,513,251 A | 4/1996 | Rochkind et al. | | 5,841,841 A | 11/1998 | Dodds et al. |
| 5,519,731 A | 5/1996 | Cioffi | | 5,842,111 A | 11/1998 | Byers |
| 5,530,737 A | 6/1996 | Bartholomew et al. | | 5,848,150 A | 12/1998 | Bingel |
| 5,533,101 A | 7/1996 | Miyagawa | | 5,878,047 A | 3/1999 | Ganek et al. |
| 5,534,912 A | 7/1996 | Kostreski | | 5,881,142 A | 3/1999 | Frankel et al. |
| 5,548,592 A | 8/1996 | Komarek et al. | | 5,886,732 A | 3/1999 | Humpleman |
| 5,550,836 A | 8/1996 | Albrecht et al. | | 5,889,765 A | 3/1999 | Gibbs |
| 5,550,900 A | 8/1996 | Ensor et al. | | 5,889,856 A | 3/1999 | O'Toole et al. |
| 5,553,063 A | 9/1996 | Dickson | | 5,892,764 A | 4/1999 | Riemann et al. |
| 5,557,612 A | 9/1996 | Bingham | | 5,896,443 A | 4/1999 | Dichter |
| 5,566,233 A | 10/1996 | Liu | | 5,896,556 A | 4/1999 | Moreland et al. |
| 5,570,355 A | 10/1996 | Dail et al. | | 5,898,761 A | 4/1999 | McHale et al. |
| 5,581,555 A | 12/1996 | Dubberly et al. | | 5,903,572 A | 5/1999 | Wright et al. |
| 5,587,692 A | 12/1996 | Graham et al. | | 5,903,643 A | 5/1999 | Bruhnke |
| 5,590,173 A | 12/1996 | Beasley | | 5,905,781 A | 5/1999 | McHale et al. |
| 5,592,540 A | 1/1997 | Beveridge | | 5,905,786 A | 5/1999 | Hoopes |
| 5,594,726 A | 1/1997 | Thompson et al. | | 5,910,970 A | 6/1999 | Lu |
| 5,594,789 A | 1/1997 | Seazholtz et al. | | 5,911,119 A | 6/1999 | Bartholomew et al. |
| 5,596,631 A | 1/1997 | Chen | | 5,911,123 A | 6/1999 | Shaffer et al. |
| 5,604,737 A | 2/1997 | Iwami et al. | | 5,912,895 A | 6/1999 | Terry et al. |
| 5,604,791 A | 2/1997 | Lee | | 5,917,814 A | 6/1999 | Balatoni |
| 5,608,447 A | 3/1997 | Farry et al. | | 5,922,047 A * | 7/1999 | Newlin et al. ............. 709/217 |
| 5,608,725 A | 3/1997 | Grube et al. | | 5,926,479 A | 7/1999 | Baran |
| 5,610,916 A | 3/1997 | Kostreski et al. | | 5,930,340 A | 7/1999 | Bell |
| 5,613,190 A | 3/1997 | Hylton | | 5,936,952 A | 8/1999 | Lecomte |
| 5,613,191 A | 3/1997 | Hylton et al. | | 5,936,963 A | 8/1999 | Saussy |
| 5,619,252 A | 4/1997 | Nakano | | 5,937,055 A | 8/1999 | Kaplan |
| 5,619,505 A | 4/1997 | Grube et al. | | 5,940,479 A | 8/1999 | Guy et al. |
| 5,621,455 A | 4/1997 | Rogers et al. | | 5,940,738 A | 8/1999 | Rao |
| 5,623,537 A | 4/1997 | Ensor et al. | | 5,943,404 A | 8/1999 | Sansom et al. |
| 5,625,651 A | 4/1997 | Cioffi | | 5,949,476 A | 9/1999 | Pocock et al. |
| 5,625,677 A | 4/1997 | Feiertag et al. | | 5,956,323 A | 9/1999 | Bowie |
| 5,625,863 A | 4/1997 | Abraham | | 5,960,066 A | 9/1999 | Hartmann et al. |
| 5,627,501 A | 5/1997 | Biran et al. | | 5,963,539 A | 10/1999 | Webber, Jr. et al. |
| 5,627,827 A | 5/1997 | Dale et al. | | 5,963,595 A | 10/1999 | Graham et al. |
| 5,646,983 A | 7/1997 | Suffern et al. | | 5,963,620 A | 10/1999 | Frankel et al. |
| 5,668,814 A | 9/1997 | Balatoni | | 5,970,127 A | 10/1999 | Smith et al. |
| 5,668,857 A | 9/1997 | McHale | | 5,982,784 A | 11/1999 | Bell |
| 5,673,290 A | 9/1997 | Cioffi | | 5,982,854 A | 11/1999 | Ehreth |
| 5,675,375 A | 10/1997 | Riffee | | 5,987,061 A | 11/1999 | Chen |
| 5,696,790 A | 12/1997 | Graham et al. | | 5,991,311 A | 11/1999 | Long et al. |
| 5,699,413 A | 12/1997 | Sridhar | | 5,995,598 A | 11/1999 | Berstis |
| 5,705,974 A | 1/1998 | Patel et al. | | 5,999,518 A | 12/1999 | Nattkemper et al. |

| | | |
|---|---|---|
| 5,999,612 A | 12/1999 | Dunn et al. |
| 6,002,682 A | 12/1999 | Bellenger et al. |
| 6,002,722 A | 12/1999 | Wu |
| 6,005,873 A | 12/1999 | Amit |
| 6,009,041 A | 12/1999 | Rolandi et al. |
| 6,011,781 A | 1/2000 | Bell |
| 6,011,910 A | 1/2000 | Chau et al. |
| 6,014,386 A | 1/2000 | Abraham |
| 6,014,431 A | 1/2000 | McHale et al. |
| 6,021,158 A | 2/2000 | Schurr et al. |
| 6,026,150 A | 2/2000 | Frank |
| 6,026,160 A | 2/2000 | Staber et al. |
| 6,028,867 A | 2/2000 | Rawson et al. |
| 6,029,047 A | 2/2000 | Ishida et al. |
| 6,032,057 A | 2/2000 | Kiiski |
| 6,038,300 A | 3/2000 | Hartmann et al. |
| 6,038,425 A | 3/2000 | Jeffrey |
| 6,040,759 A | 3/2000 | Sanderson |
| 6,047,055 A | 4/2000 | Carkner et al. |
| 6,049,531 A | 4/2000 | Roy |
| 6,052,380 A | 4/2000 | Bell |
| 6,055,242 A | 4/2000 | Doshi et al. |
| 6,055,268 A | 4/2000 | Timm et al. |
| 6,055,435 A | 4/2000 | Smith et al. |
| 6,061,357 A | 5/2000 | Olshansky et al. |
| 6,061,392 A | 5/2000 | Bremer et al. |
| 6,064,422 A | 5/2000 | Goolcharan et al. |
| 6,069,879 A | 5/2000 | Chatter |
| 6,069,890 A | 5/2000 | White et al. |
| 6,069,899 A | 5/2000 | Foley |
| 6,072,779 A | 6/2000 | Tzannes et al. |
| 6,072,810 A | 6/2000 | Van der Putten et al. |
| 6,075,784 A | 6/2000 | Frankel et al. |
| 6,075,787 A | 6/2000 | Bobeck et al. |
| 6,081,519 A | 6/2000 | Petler |
| 6,087,860 A | 7/2000 | Liu et al. |
| 6,088,368 A | 7/2000 | Rubinstain et al. |
| 6,091,932 A | 7/2000 | Langlais |
| 6,094,441 A | 7/2000 | Jung et al. |
| 6,097,801 A | 8/2000 | Williams et al. |
| 6,101,341 A | 8/2000 | Manabe |
| 6,107,912 A | 8/2000 | Bullock et al. |
| 6,111,595 A | 8/2000 | Hertrich |
| 6,111,936 A | 8/2000 | Bremer |
| 6,114,970 A | 9/2000 | Kirson et al. |
| 6,115,755 A | 9/2000 | Krishan |
| 6,128,471 A | 10/2000 | Quelch et al. |
| 6,130,879 A | 10/2000 | Liu |
| 6,130,893 A * | 10/2000 | Whittaker et al. ............ 370/420 |
| 6,134,235 A | 10/2000 | Goldman et al. |
| 6,134,308 A | 10/2000 | Fallon et al. |
| 6,137,865 A | 10/2000 | Ripy et al. |
| 6,137,866 A | 10/2000 | Staber et al. |
| 6,141,330 A | 10/2000 | Akers |
| 6,141,339 A | 10/2000 | Kaplan et al. |
| 6,141,356 A | 10/2000 | Gorman |
| 6,144,399 A | 11/2000 | Manchester et al. |
| 6,148,006 A | 11/2000 | Dyke et al. |
| 6,154,465 A | 11/2000 | Pickett |
| 167,043 A | 12/2000 | Frantz |
| 6,157,292 A | 12/2000 | Piercy et al. |
| 6,160,880 A | 12/2000 | Allen |
| 6,161,134 A | 12/2000 | Wang et al. |
| 6,167,043 A | 12/2000 | Frantz |
| 169,795 A | 1/2001 | Dunn et al. |
| 6,178,161 B1 | 1/2001 | Terry |
| 6,181,715 B1 | 1/2001 | Phillips et al. |
| 6,181,775 B1 | 1/2001 | Bella |
| 6,186,826 B1 | 2/2001 | Weikle |
| 6,192,399 B1 | 2/2001 | Goodman |
| 6,195,706 B1 | 2/2001 | Scott |
| 6,202,211 B1 | 3/2001 | Williams, Jr. |
| 6,205,202 B1 | 3/2001 | Yoshida et al. |
| 6,208,637 B1 | 3/2001 | Eames |
| 6,212,204 B1 | 4/2001 | Depue |
| 6,212,227 B1 | 4/2001 | Ko et al. |
| 6,215,789 B1 | 4/2001 | Keenan et al. |
| 6,215,799 B1 | 4/2001 | Mitchell et al. |
| 6,215,855 B1 | 4/2001 | Schneider |
| 6,216,160 B1 | 4/2001 | Dichter |
| 6,229,818 B1 | 5/2001 | Bell |
| 6,236,653 B1 | 5/2001 | Dalton et al. |
| 6,239,672 B1 | 5/2001 | Lutz, Jr. et al. |
| 6,240,091 B1 | 5/2001 | Ginzboorg et al. |
| 6,240,166 B1 | 5/2001 | Collin et al. |
| 6,243,394 B1 | 6/2001 | Deng |
| 6,243,571 B1 | 6/2001 | Bullock et al. |
| 6,246,695 B1 | 6/2001 | Seazholtz et al. |
| 6,246,716 B1 | 6/2001 | Schneider |
| 6,252,755 B1 | 6/2001 | Willer |
| 6,259,676 B1 | 7/2001 | Kellock et al. |
| 6,259,775 B1 | 7/2001 | Alpert et al. |
| 6,266,348 B1 | 7/2001 | Gross et al. |
| 6,272,209 B1 | 8/2001 | Bridger et al. |
| 6,272,219 B1 | 8/2001 | De Bruycker et al. |
| 6,278,769 B1 | 8/2001 | Bella |
| 6,282,238 B1 | 8/2001 | Landry |
| 6,282,277 B1 | 8/2001 | DeBalko |
| 6,286,049 B1 | 9/2001 | Rajakarunanayake et al. |
| 6,288,334 B1 | 9/2001 | Hennum |
| 6,292,467 B1 | 9/2001 | Keller |
| 6,292,517 B1 | 9/2001 | Jeffress et al. |
| 6,298,037 B1 | 10/2001 | Sharifi |
| 6,301,337 B1 | 10/2001 | Scholtz et al. |
| 6,310,894 B1 | 10/2001 | Counterman |
| 6,310,909 B1 | 10/2001 | Jones |
| 6,310,940 B1 | 10/2001 | Ratz |
| 6,314,102 B1 | 11/2001 | Czerwiec et al. |
| 6,317,884 B1 | 11/2001 | Eames et al. |
| 6,320,900 B1 | 11/2001 | Liu |
| 6,324,268 B1 | 11/2001 | Balachandran et al. |
| 6,329,937 B1 | 12/2001 | Harman |
| 6,334,219 B1 | 12/2001 | Hill et al. |
| 6,339,594 B1 | 1/2002 | Civanlar et al. |
| 6,345,047 B1 | 2/2002 | Regnier |
| 6,346,964 B1 | 2/2002 | Rogers et al. |
| 6,349,098 B1 | 2/2002 | Parruck et al. |
| 6,349,133 B1 | 2/2002 | Matthews et al. |
| 6,353,629 B1 | 3/2002 | Pal |
| 6,359,906 B1 | 3/2002 | Dyke et al. |
| 6,370,149 B1 | 4/2002 | Gorman et al. |
| 6,385,203 B2 | 5/2002 | McHale et al. |
| 6,388,990 B1 | 5/2002 | Wetzel |
| 6,389,110 B1 | 5/2002 | Fischer et al. |
| 6,389,125 B1 | 5/2002 | Ubowski |
| 6,393,050 B1 | 5/2002 | Liu |
| 6,396,391 B1 | 5/2002 | Binder |
| 6,396,393 B2 | 5/2002 | Yuasa |
| 6,396,837 B1 | 5/2002 | Wang et al. |
| 6,400,815 B1 | 6/2002 | Gilboy et al. |
| 6,404,773 B1 | 6/2002 | Williams et al. |
| 6,404,861 B1 | 6/2002 | Cohen et al. |
| 6,405,027 B1 | 6/2002 | Bell |
| 6,414,952 B2 | 7/2002 | Foley |
| 6,424,661 B1 | 7/2002 | Bentley |
| 6,426,942 B1 | 7/2002 | Sienel et al. |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,438,109 B1 | 8/2002 | Karaoguz et al. |
| 6,442,195 B1 | 8/2002 | Liu et al. |
| 6,445,087 B1 | 9/2002 | Wang et al. |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,714 B2 | 9/2002 | Shima et al. |
| 6,459,692 B1 | 10/2002 | Ben-Michael et al. |
| 6,466,572 B1 | 10/2002 | Ethridge et al. |
| 6,470,053 B1 | 10/2002 | Liu |
| 6,473,495 B1 | 10/2002 | Willer |
| 6,477,595 B1 | 11/2002 | Cohen et al. |
| 6,480,510 B1 | 11/2002 | Binder |
| 6,483,902 B1 | 11/2002 | Stewart et al. |
| 6,483,903 B1 | 11/2002 | Itay et al. |
| 6,490,273 B1 | 12/2002 | DeNap et al. |
| 6,493,325 B1 | 12/2002 | Hjalmtysson et al. |
| 6,493,875 B1 | 12/2002 | Eames et al. |

| Patent | Date | Name |
|---|---|---|
| 6,507,647 B1 | 1/2003 | Mandalia |
| 6,519,291 B1 | 2/2003 | Dagdeviren et al. |
| 6,522,352 B1 | 2/2003 | Strandwitz et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 * | 2/2003 | Edson ............... 725/74 |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,539,011 B1 | 3/2003 | Keenan et al. |
| 6,542,465 B1 | 4/2003 | Wang |
| 6,546,024 B1 | 4/2003 | Sharper et al. |
| 6,546,098 B1 | 4/2003 | Henderson |
| 6,549,616 B1 | 4/2003 | Binder |
| 6,556,564 B2 | 4/2003 | Rogers |
| 6,556,581 B1 | 4/2003 | He et al. |
| 6,560,225 B1 | 5/2003 | Czajkowski et al. |
| 6,560,319 B1 | 5/2003 | Binder |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,580,710 B1 | 6/2003 | Bowen et al. |
| 6,580,727 B1 | 6/2003 | Yim et al. |
| 6,580,785 B2 | 6/2003 | Bremer et al. |
| 6,584,122 B1 | 6/2003 | Matthews et al. |
| 6,584,148 B1 | 6/2003 | Zitting et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,597,732 B1 | 7/2003 | Dowling |
| 6,600,734 B1 | 7/2003 | Gernert et al. |
| 6,603,808 B1 | 8/2003 | Anne et al. |
| 6,608,894 B1 | 8/2003 | Armenta |
| 6,611,537 B1 | 8/2003 | Edens et al. |
| 6,636,505 B1 | 10/2003 | Wang et al. |
| 6,639,913 B1 | 10/2003 | Frankel et al. |
| 6,657,994 B1 | 12/2003 | Rajakarunanayake |
| 6,674,843 B1 | 1/2004 | Ham |
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,686,832 B2 | 2/2004 | Abraham |
| 6,690,677 B1 | 2/2004 | Binder |
| 6,693,916 B1 | 2/2004 | Chaplik et al. |
| 6,697,358 B2 | 2/2004 | Berstein |
| 6,700,970 B1 | 3/2004 | Aronson et al. |
| 6,701,406 B1 | 3/2004 | Chang et al. |
| 6,704,414 B2 | 3/2004 | Murakoshi |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,744,883 B1 | 6/2004 | Bingel et al. |
| 6,747,995 B1 | 6/2004 | Brown et al. |
| 6,747,996 B2 | 6/2004 | Holloway et al. |
| 6,751,212 B1 | 6/2004 | Kaji et al. |
| 6,754,186 B1 | 6/2004 | Bullman |
| 6,754,235 B2 | 6/2004 | Van Der Putten et al. |
| 6,757,382 B1 | 6/2004 | Wilkes, Jr. et al. |
| 6,759,946 B2 | 7/2004 | Sahinoglu et al. |
| 6,760,384 B1 | 7/2004 | Garreau et al. |
| 6,763,097 B1 | 7/2004 | Vitenberg |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,269 B1 | 8/2004 | Kaczmarczyk et al. |
| 6,778,549 B1 | 8/2004 | Keller |
| 6,778,646 B1 | 8/2004 | Sun |
| 6,778,817 B1 | 8/2004 | Bullock et al. |
| 6,785,296 B1 | 8/2004 | Bell |
| 6,788,782 B1 | 9/2004 | Fotsch et al. |
| 6,792,323 B2 | 9/2004 | Krzyzanowski et al. |
| 6,798,767 B1 | 9/2004 | Alexande et al. |
| 6,813,343 B1 | 11/2004 | Vitenberg |
| 6,816,512 B2 | 11/2004 | Lazarus et al. |
| 6,819,760 B1 | 11/2004 | Nayler |
| 6,823,047 B1 | 11/2004 | Cruickshank |
| 6,826,174 B1 | 11/2004 | Erekson et al. |
| 6,831,975 B1 | 12/2004 | Easwaran et al. |
| 6,834,057 B1 | 12/2004 | Rabenko et al. |
| 6,836,546 B1 | 12/2004 | Willer |
| 6,839,345 B2 | 1/2005 | Lu et al. |
| 6,842,426 B2 | 1/2005 | Bogardus et al. |
| 6,842,459 B1 | 1/2005 | Binder |
| 6,847,718 B1 | 1/2005 | Hiraoka |
| 6,853,724 B2 | 2/2005 | Wang |
| 6,856,616 B1 | 2/2005 | Schuster et al. |
| 6,862,353 B2 | 3/2005 | Rabenko et al. |
| 6,865,193 B2 | 3/2005 | Terk |
| 6,868,072 B1 | 3/2005 | Lin et al. |
| 6,868,081 B1 | 3/2005 | Akram et al. |
| 6,868,117 B1 | 3/2005 | Mardinian |
| 6,868,265 B2 | 3/2005 | Zodnik |
| 6,876,648 B1 | 4/2005 | Lee |
| 6,882,714 B1 | 4/2005 | Mansfield |
| 6,886,181 B1 | 4/2005 | Dodds et al. |
| 6,891,881 B2 | 5/2005 | Trachewsky et al. |
| 6,895,089 B2 | 5/2005 | Wang |
| 6,898,413 B2 | 5/2005 | Yip et al. |
| 6,904,134 B2 | 6/2005 | Jeon et al. |
| 6,904,149 B2 | 6/2005 | Keenum et al. |
| 6,909,725 B1 | 6/2005 | Chow |
| 6,912,209 B1 | 6/2005 | Thi et al. |
| 6,922,407 B2 | 7/2005 | Wu |
| 6,925,089 B2 | 8/2005 | Chow et al. |
| 6,927,340 B1 | 8/2005 | Binder et al. |
| 6,934,754 B2 | 8/2005 | West et al. |
| 6,937,056 B2 | 8/2005 | Binder |
| 6,940,918 B2 | 9/2005 | Nayler et al. |
| 6,941,364 B2 | 9/2005 | Kim et al. |
| 6,947,736 B2 | 9/2005 | Shaver et al. |
| 6,956,826 B1 | 10/2005 | Binder |
| 6,961,303 B1 | 11/2005 | Binder |
| 6,963,559 B2 | 11/2005 | Elo |
| 6,975,713 B1 | 12/2005 | Smith et al. |
| 6,980,638 B1 | 12/2005 | Smith et al. |
| 6,981,892 B1 | 1/2006 | Kostelnik |
| 6,985,714 B2 | 1/2006 | Akiyama et al. |
| 6,989,733 B2 | 1/2006 | Simonsen et al. |
| 6,995,657 B2 | 2/2006 | Zalitzky et al. |
| 6,996,134 B1 | 2/2006 | Renucci et al. |
| 6,996,213 B1 | 2/2006 | De Jong |
| 6,996,729 B2 | 2/2006 | Volkening et al. |
| 6,998,964 B2 | 2/2006 | Lomax, Jr. et al. |
| 6,999,433 B2 | 2/2006 | Baum |
| 7,002,898 B1 | 2/2006 | Lou |
| 7,003,102 B2 | 2/2006 | Kiko |
| 7,006,445 B1 | 2/2006 | Cole et al. |
| 7,009,946 B1 | 3/2006 | Kardach |
| 7,010,002 B2 | 3/2006 | Chow et al. |
| 7,012,922 B1 | 3/2006 | Unitt et al. |
| 7,016,377 B1 | 3/2006 | Chun et al. |
| 7,020,130 B2 | 3/2006 | Krause et al. |
| 7,027,566 B2 | 4/2006 | Bossemeyer, Jr. et al. |
| 7,031,394 B2 | 4/2006 | Vitenberg |

| | | | | | | |
|---|---|---|---|---|---|---|
| 7,035,270 | B2 | 4/2006 | Moore, Jr. et al. | 2003/0204393 A1 | 10/2003 | Czerwiec et al. |
| 7,050,546 | B1 | 5/2006 | Richardson et al. | 2004/0006484 A1 | 1/2004 | Manis et al. |
| 7,054,303 | B2 | 5/2006 | Miyazaki et al. | 2004/0037317 A1 | 2/2004 | Zalitzky et al. |
| 7,054,442 | B2 | 5/2006 | Weikle | 2004/0083262 A1 | 4/2004 | Trantow |
| 7,058,174 | B2 | 6/2006 | Posthuma | 2004/0087214 A1 | 5/2004 | Cho |
| 7,068,649 | B2 | 6/2006 | Fisher et al. | 2004/0090984 A1 | 5/2004 | Saint-Hilaire et al. |
| 7,068,668 | B2 | 6/2006 | Feuer | 2004/0107299 A1 | 6/2004 | Lee et al. |
| 7,068,682 | B2 | 6/2006 | Campbell et al. | 2004/0136373 A1 | 7/2004 | Bareis |
| 7,082,141 | B2 | 7/2006 | Sharma et al. | 2004/0147232 A1 | 7/2004 | Zodnik |
| 7,085,238 | B2 | 8/2006 | McBeath | 2004/0156513 A1 | 8/2004 | Kaylor et al. |
| 7,088,238 | B2 | 8/2006 | Karaoguz et al. | 2004/0170262 A1 | 9/2004 | Ohno |
| 7,092,518 | B2 | 8/2006 | Eckel et al. | 2004/0172658 A1 | 9/2004 | Rakib et al. |
| 7,095,849 | B2 | 8/2006 | Smith et al. | 2004/0177167 A1 | 9/2004 | Iwamura et al. |
| 7,099,368 | B2 | 8/2006 | Santhoff et al. | 2004/0180573 A1 | 9/2004 | Chen |
| 7,106,721 | B1 | 9/2006 | Binder | 2004/0198236 A1 | 10/2004 | Paine et al. |
| 7,113,574 | B1 | 9/2006 | Haas et al. | 2004/0204040 A1 | 10/2004 | Heijnen |
| 7,116,685 | B2 | 10/2006 | Brown et al. | 2004/0208167 A1 | 10/2004 | Kishida |
| 7,117,520 | B2 | 10/2006 | Stewart | 2004/0250273 A1 | 12/2004 | Swix et al. |
| 7,133,423 | B1 | 11/2006 | Chow et al. | 2004/0268160 A1 | 12/2004 | Atkinson et al. |
| 7,142,560 | B2 | 11/2006 | Mansfield | 2005/0015805 A1 | 1/2005 | Iwamura |
| 7,142,563 | B1 | 11/2006 | Lin | 2005/0018766 A1 | 1/2005 | Iwamura |
| 7,142,934 | B2 | 11/2006 | Janik | 2005/0038875 A1 | 2/2005 | Park |
| 7,145,996 | B2 | 12/2006 | Creamer et al. | 2005/0047431 A1 | 3/2005 | Binder |
| 7,149,182 | B1 | 12/2006 | Renucci et al. | 2005/0076149 A1 | 4/2005 | McKown et al. |
| 7,149,474 | B1 | 12/2006 | Mikhak | 2005/0086694 A1 | 4/2005 | Hicks et al. |
| 7,154,996 | B2 | 12/2006 | Strauss | 2005/0114325 A1 | 5/2005 | Liu et al. |
| 7,162,013 | B2 | 1/2007 | Gavette et al. | 2005/0150100 A1 | 7/2005 | Merdan et al. |
| 7,164,690 | B2 | 1/2007 | Limb et al. | 2005/0152337 A1 | 7/2005 | Wurtzel et al. |
| 7,167,923 | B2 | 1/2007 | Lo | 2005/0226200 A1 | 10/2005 | Askildsen et al. |
| 7,171,506 | B2 | 1/2007 | Iwamura | 2006/0029210 A1 | 2/2006 | Feugere |
| 7,190,716 | B2 | 3/2007 | Norrell et al. | 2006/0140178 A1 | 6/2006 | Cheng et al. |
| 7,194,639 | B2 | 3/2007 | Atkinson et al. | 2006/0153169 A1 | 7/2006 | Koifman et al. |
| 7,199,706 | B2 | 4/2007 | Dawson et al. | 2006/0193310 A1 | 8/2006 | Landry et al. |
| 7,206,322 | B1 | 4/2007 | Garg et al. | 2006/0193313 A1 | 8/2006 | Landry et al. |
| 7,206,417 | B2 | 4/2007 | Nathan | 2006/0215680 A1 | 9/2006 | Camagna |
| 7,209,719 | B2 | 4/2007 | Liebenow | 2006/0238250 A1 | 10/2006 | Camagna et al. |
| 7,209,945 | B2 | 4/2007 | Hicks, III et al. | 2006/0251094 A1 | 11/2006 | Van Vleck et al. |
| 7,215,763 | B1 | 5/2007 | Keller et al. | 2006/0251159 A1 | 11/2006 | Huotari et al. |
| 7,239,627 | B2 | 7/2007 | Nattkemper et al. | 2006/0251179 A1 | 11/2006 | Ghoshal |
| 7,239,628 | B1 | 7/2007 | Pendleton et al. | 2006/0280197 A1 | 12/2006 | Stone |
| 7,256,704 | B2 | 8/2007 | Yoon et al. | 2006/0291493 A1 | 12/2006 | Schley-May et al. |
| 7,257,106 | B2 | 8/2007 | Chen et al. | 2007/0198748 A1 | 8/2007 | Ametsitsi et al. |
| 7,263,362 | B1 | 8/2007 | Young et al. | 2008/0140565 A1 | 6/2008 | DeBenedetti et al. |
| 7,274,669 | B2 | 9/2007 | Czerwiec et al. | 2008/0153415 A1 | 6/2008 | Block et al. |
| 7,283,554 | B2 | 10/2007 | Ophir et al. | | | |
| 7,292,859 | B2 | 11/2007 | Park | FOREIGN PATENT DOCUMENTS | | |
| 7,293,103 | B1 | 11/2007 | Lin et al. | WO WO 97/19533 A1 | 5/1997 | |
| 7,301,940 | B1 | 11/2007 | Bernstein | WO WO 99/12330 A1 | 3/1999 | |
| 7,305,006 | B1 | 12/2007 | Bella | WO WO 00/07322 A2 | 2/2000 | |
| 7,308,086 | B2 | 12/2007 | Yoshitani | WO WO 01/28215 A1 | 4/2001 | |
| 7,317,793 | B2 | 1/2008 | Binder | WO WO 0128215 | 4/2001 | |
| 7,327,765 | B1 | 2/2008 | Ojard | WO WO 01/71980 A1 | 9/2001 | |
| 7,340,051 | B2 | 3/2008 | Phillips et al. | WO WO 01/80595 A1 | 10/2001 | |
| 7,346,071 | B2 | 3/2008 | Bareis | WO WO-01/82530 A | 11/2001 | |
| 7,382,786 | B2 | 6/2008 | Chen et al. | WO WO 02/065229 A2 | 8/2002 | |
| 7,408,949 | B2 | 8/2008 | Baum | WO WO 03/005691 A1 | 1/2003 | |
| 2001/0030950 A1 | | 10/2001 | Chen et al. | WO WO-2005/032158 | 4/2005 | |
| 2001/0038635 A1 | | 11/2001 | Rogers | | | |
| 2001/0047418 A1 | | 11/2001 | White | OTHER PUBLICATIONS | | |
| 2002/0006137 A1 | | 1/2002 | Rabenko et al. | | | |
| 2002/0035624 A1 | | 3/2002 | Kim | | | |
| 2002/0037004 A1 | | 3/2002 | Bossemeyer et al. | | | |
| 2002/0061012 A1 | | 5/2002 | Thi et al. | | | |
| 2002/0063924 A1 | | 5/2002 | Kimbrough et al. | | | |
| 2002/0111077 A1 | | 8/2002 | Keenum | | | |
| 2002/0114325 A1 | | 8/2002 | Dale et al. | | | |
| 2002/0128009 A1 | | 9/2002 | Boch et al. | | | |
| 2002/0131422 A1 | | 9/2002 | Chu et al. | | | |
| 2002/0144159 A1 | | 10/2002 | Wu et al. | | | |
| 2002/0150100 A1 | | 10/2002 | White et al. | | | |
| 2002/0154629 A1 | | 10/2002 | Lohman et al. | | | |
| 2002/0176567 A1 | | 11/2002 | Chen et al. | | | |
| 2002/0198952 A1 | | 12/2002 | Bell | | | |
| 2003/0016794 A1 | | 1/2003 | Brothers | | | |
| 2003/0048895 A1 | | 3/2003 | Kiko et al. | | | |
| 2003/0067910 A1 | | 4/2003 | Razazian et al. | | | |
| 2003/0088706 A1 | | 5/2003 | Chan et al. | | | |
| 2003/0198246 A1 | | 10/2003 | Lifshitz et al. | | | |
| 2003/0198341 A1 | | 10/2003 | Smith et al. | | | |

G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.

C. Dougligeris, et al., "Communications and Control for a Home Automation System", Conference: IEEE Proceedings of the Southeastcon '91, vol. 1, pp. 171-175.

D.G.J. Fanshawe, "Architures for Home Systems", Conference: IEEE Colloquium on Home Systems—Information, Entertainment and Control, Oct. 1, 1990, London, United Kingdom, pp. 3/1-3/3.

N.C. Hightower, "Integrated Voice, Data and Video in the Local Loop", IEEE 1986, pp. 915-919.

M. Inoue, et al., "A Home Automation System", IEEE Transactions on Consumer Electronics, vol. CE-31, No. 3, Aug. 1985, pp. 516-527.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page.

S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.

G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.

H. Nishi, et al., "Control of a Star/Bus Key Telephone System", NTT R & D, vol. 39, No. 8, 1990, pp. 122, 1222, 1224-1228.

A. Pietrasik, et al., "Subscriber Carrier Telephony System 1+1", Wiadomosci Telekomunikacyjne, vol. 17, No. 7-8, Jul.-Aug. 1977, pp. 183-198.

V. Punj, "Broadband Applications and Services of Public Switched Networks", IEEE Transactions on Consumer Electronics, vol. 35, No. 2, May 1989, pp. 106-112.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

C. Valenti, "Study of the Feasibility and Advisability of Digital Subscriber Lines Operating at Rates Substantially in Excess of the Basic Access Rate", T1E1.r Technical Subcommitte (T1E1.4/91-115), pp. 2 and 4.

D. L. Waring, "The Asymmetrical Digital Subscriber Line (ADSL): A New Transport Technology for Delivering Wideband Capabilities to the Residence", Globecom '91, IEEE, pp. 1979-1986.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazakli, et al., "Home Appliance Technologies," NEC Research and Development, No. 96, Mar. 1990, pp. 292-299.

Funkschau, "CEBus: US Households are Being Networked", No. 9, Apr. 1989, pp. 45-47.

"Shared Services (Data/Voice Network)", Communications News, vol. 25, No. 11, Nov. 1988, pp. 46-47.

Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).

A. Artom, et al., "The Possible Use of Customer Loop for New Services During the Transition From Analogue to Digital", Revue F.I.T.C.E., Mar.-Apr. 1981, vol. 20, No. 2, pp. 50-56.

A. Artom, et al., "Medium-Term Prospects for New Servies to the Telephone Customers," Conference Record, Jun. 14-18, 1981, Int'l Conf. On Communications, Denver, CO., pp. 14.4.1-14.4-6.

Hoe-Young Noh, "Home Automation", Korea Information Science Society Review, Apr. 1989, vol. 7 No. 2, pp. 40-44, Republic of Korea. (Translation Provided).

M. Coronaro, et al., "Integrated Office Communication System," Electrical Communication, 1986, pp. 17-22, vol. 60, No. 1, FACE Research Center, Pomezia, Italy.

Chow, et al., "A Multi-drop In-House ADSL Distribution Network"; IEEE 1994, pp. 456-460.

English Language Abstract for Japanese Patent 1-27358 (64-27358) Jan. 30, 1989.

Bellcore: Request for Information: Asymmetrical Digital Subscriber Line (ADSL) Systems That Support Simplex High-Bit-Rate Access and POTS in the Copper Loop Plant; Jun. 1991.

Twisted Pair Physical Layer and Medium Specification; Revision: IS-60 8-18-95 (49 pages).

Introduction to the CEBus Standard; Revision 2-5-95 Draft Copy (19 pages).

Compaq to Ride the CEBus; by Mark Hachman, EBN Jan. 22, 1996 (1 page).

CEBus Router Testing; IEEE Transactions on Consumer Electronics Nov. 1991, vol. 37 No. 4 (8 pages).

Broadband Network Technology—An Overview for the Data and Telecommunications Industries; by Edward Cooper, Copyright 1984, p. 51-52 (4 pages).

Technical Report TR-001 ADSL Forum System Reference Model; May 1996 (6 pages).

DSLPipe User's Guide; by Ascend Communications, Jun. 3, 1997 (245 pages).

DSLPipe Reference Guide; by Ascend Communications, Jun. 2, 1997 (162 pages).

Ascend DSLPipe-S Features; Posted May 12, 1997 (2 pages).

Ascend DSLPipe-S Specifications; (2 pages).

Broadband Digital Subscriber Line—A Full Service Network for the Copper Plant; Telephony / Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, pages (s), None.

"Home Phoneline Networking Alliance", Interface Specification for HomePNA 2.0 10M8 Technology Link Layer Protocol, (Dec. 1, 1999), pp. 1-39.

"Home Phoneline Networking Alliance", Interface Specification for HomePNA 2.0 10M8 Technology, (Dec. 1, 1999), pp. 1-77.

Paola Bisaglia, et al., Receiver Architectures for HomePNA 2.0 , Hewlett Packard Laboratories, Bristol, U.K., Oct. 17, 2001.

Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International Symposium; pp. 861-866 vol. 2.

Phoneline / HPNA / HomePNA Networks, http://www.homenethelp.com/web/howto/HomeNet-HPNA.asp (visited Jul. 29, 2003) (3 pages).

Anonymous, HomePNA Specification 1.0 Field Tests Status, Mar. 1999, Home Phoneline Networking Alliance, Inc, pp. 1-6.

21145 Phoneline/Ethernet LAN Controller, Intel Corporation .COPYRGT. 1999, http://developer.intel.com/design/network/21145.htm.

Simple, High-Speed Ethernet Technology for the Home, White Paper, Home Phoneline Networking Alliance, Jun. 1998, pp. 1-11.

Information on Home PhoneLine Networking Alliance (Home PNA), dated Jun. 1998 and before.

C. Valenti, "Study of the Feasibility and Advisability of Digital Subscriber Lines Operating at Rates Substantially in Excess of the Basic Access Rate", T1E1.R Technical Subcommittee (T1E1.4/91-115), pp. 2 and 4; Aug. 26, 1991.

Ascend DSLPipe-S Specifications; copyright 1997, (2 pages).

J. Hofmann, Cable, Television, and the Consumer Electronic Bus, Symposium Record, 15th International TV Symposium, Jun. 11, 1987, Montreux, Switzerland.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page, 1998.

"TeleConcepts . . . Introduces the Just Plug It in Intercom System,"TeleConcepts Brochure, Newington, CT, 2 pages, published before Jul. 3, 1995.

TeleVideo Brochure, 2 pages, published before Jul. 3, 1995.

"Video Transmission System—Send Video Over Ordinary Wire—No Coax Required", Javelin Brochure, 2 pages, published before Jul. 3, 1995.

"The DSL Sourcebook", Paradyne Corporation, Copyright 2000, DSL-BOOK-3.0-0900, 98 pages.

Olshansky, "A Full Service Network for the Copper Plant", Telephony, 1985, pp. 52-60.

"TeleConcepts . . . Introduces the Just Plug It In Intercom System,"TeleConcepts Brochure, Newington, CT, 2 pages.

"Video Transmission System—Send Video Over Ordinary Wire—No Coax Required", Javelin Brochure, 2 pages.

TeleVideo Brochure, 2 pages.

Instant Network Rules on Phone Lines, Electronic Design, 1987.

O. Agazzi, et al., "Large Scale Integration of Hybrid-Method Digital Subscriber Loops,"IEEE Transactions on Communications, vol. COM-30, No. 9, Sep. 1982, pp. 2095-2108.

S.V. Ahamed, et al., "A tutorial on Two-Wire Digital Transmission in the Loop Plant", IEEE Transactions on Communications, vol. COM-29, No. 11, Nov. 1991, pp. 1554-1564.

J. Alves, "Data Over Voice—A Low Cost LAN Alternative", Communications Show and Conference, MECOM 87, January, pp. 13-15.

S.B. Andrews, "The Generic Digital Channel Concept", IEEE International Conference on Communications, 1985, Jun. 23-26, 1985, Chicago, IL, pp. 7.1.1-7.1.3.

G.W. Beene, "Design Considerations for a CO-Powered Distributed-Drop PCM Station Carrier", IEEE Transactions on Communications, vol. COM-30, No. 9, Sep. 1982, pp. 2022-2028.

A. Bienz, "1+1=1—Order Das Telefonnetz Als Datennetz", Sysdata, vol. 16, Aug. 28, 1985, pp. 41-42.

A. Brosio, et al., "A Comparison of Digital Subscriber Line Transmission Systems Employing Different Line Codes", IEEE Transactions on Communications, vol. COM-29, No. 11, Nov. 1981, pp. 1581-1588.

T.P. Byrne, et al., "Positioning the Subscriber Loop Network for Digital Services", IEEE Transactions on Communications, vol. COM-30, No. 9, Sep. 1982, pp. 2006-2011.

R.G. Cornell, et al., "Progress Towards Digital Subscriber Line Services and Signaling", IEEE Transactions on Communications, vol. Com-29, No. 11, Nov. 1981, pp. 1589-1594.

S. Davis, "Integrating Voice and Data: A Marriage of Convenience", Today's Office, vol. 24, No. 9, Feb. 1990, pp. 28-30.

M. Devault, et al., "Resaux Domestiques et Terminaux Audiovisuels Numeriques", L'Echo Des Recherches, No. 126, 1986, pp. 37-46.

H. Fuchs, et al., "Providing Full Duplex Transmission Over Two-Wire Subscriber Loops", Telephony, vol. 208, No. 11, Mar. 18, 1985, pp. 76, 77, 78 and 84.

H. Fukagawa, et al., "Bus Wiring System for Residences", Matsushita Electric Works Technical Report, No. 36, Feb. 1988, pp. 31-35.

D. Glick, et al., "Providing Telco Customers Continuous Data Services", Telephony, vol. 205, No. 22, Nov. 1983, pp. 46, 50, 51, 54.

J.B. Hughes, et al., "A Receiver IC for a 1+1 Digital Subscriber Loop", IEEE Journal of Solid State Circuitry, vol. S.C. 20, No. 3, Jun. 1985 pp. 671-678.

R. Jelski, "Subscriber Subcarrier System—A New Life," Communications International, vol. 4, No. 5, May 1977, pp. 29-30.

A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.

T. Masuda, et al., "2-Wire Video Intercom System with Telephone", National Technical Report, vol. 37, No. 6, Dec. 1991, pp. 74-80.

T. Matthews, "Telecomm System is Nerve Center", Infosystems, vol. 31, No. 5, May 1984, pp. 68-69.

J. K. Merrow, "A New Approach to Integrating Local Area Data and Voice Transmission," Telephony, vol. 250, No. 17, Oct. 1983, 2 pages.

H. Morgan, "Two-Wire Full-Duplex Modem Simplifies Voice and Data Networking", Mini-Micro Systems, vol. 17, No. 3, Mar. 1984, 4 pages.

R. Murakoshi, "Home Automation", Journal of the Society of Instrument and Control Engineers, vol. 23, No. 11, Nov. 1984, pp. 955-958.

R.D. Nash, et al., "Simultaneous Transmission of Speech and Data Over an Analog Telephone Channel", Globecom '85. IEEE Global Telecommunications Conference. Conference Record. Communication Technology to Provide New Services, Dec. 25, 1985, New Orleans, Louisiana, pp. 4.2.1-4.2.4.

H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

R.A. Tatum, "Project Victoria—the 7-in-1 Solution", Telephone Engineer and Management, vol. 90, No. 1, Jan. 1, 1986, pp. 47 and 50.

A. Teshima, et al., "Still Video Telecommunication Over the Analog Telephone Network", Journal of the Institute of Television Engineers of Japan, vol. 42, No. 11, Nov. 1988, pp. 1162-1167.

S.R. Treves, et al., "Text, Image and Data Integration in a Distributed Control Digital Voice Switching System", International Switching Symposium—ISS '81 CIC, Sep. 21-25, 1981, Montreal, Quebec, Canada, pp. 1-7.

T. Tsuda, et al., "Experimental In-House Multiservice Communication System", Fujitsu Scientific and Technical Journal, vol. 16, No. 3, Sep. 1980, pp. 29-45.

K. Urui, "Integrated Voice/Data Digital EPBX", Toshiba Review, No. 150, Winter 1984, pp. 30-33.

A.F. Van Den Berg, et al., "Principles van de Modem: Technieken en Specificaties", Elektronica, vol. 32, No. 5, Mar. 9, 1984, pp. 11, 13, 15, 17, 19 and 21.

M.G. Vry, et al., "Digital 1+1 Systems for Local Network Enhancement", Conference on Communications Equipment and Systems, Apr. 20-22, 1982, Birmingham, United Kingdom, pp. 61-64.

M.G. Vry, et al., "The Design of a 1+1 System for Digital Signal Transmission to the Subscriber", NTG-Bachberichte, vol. 73, 1980, pp. 36-40.

J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.

K. Yamamoto, "A Home Terminal System Using the Home Area Information Network", IEEE Transactions on Consumer Electronics, vol. CE-30, No. 4, Nov. 1984, pp. 608-616.

"Centrex LAN Can Provide Advanced Network Capabilities Over the Existing Telephone Wires", Communications News, vol. 25, No. 6, Jun. 1988, p. 27.

"Data Over Voice is Solution for Corporate Network", Telephone Engineer and Management, vol. 91, No. 9, May 1, 1987, pp. 67-69.

"Data Carrier System Allows Simultaneous Voice/Data Transmission for PABX Telephone Systems", Computer Design, vol. 21, No. 5, May 1982, pp. 68 and 70.

"Computerized Telephone System Integrates Voice and Data Switching", Computer Design, vol. 20, No. 4, Apr. 1981, 6 pages.

"AT&T's Systemax Premises Distribution System Solves Networking Problems", Fiber Optics Magazine, vol. 12, No. 4, Jul.-Aug. 1990, pp. 14-16.

M.M. Anderson, "Video Services on Copper", Conference: ICC 91, International Conference on Communications Conference Record, Jun. 2-26, 1991, Denver, CO, pp. 302-306.

M. Bastian, "Voice-Data Integration: An Architecture Perspective," IEEE Communications Magazine, vol. 24, No. 7, Jul. 1986, pp. 8-12.

M. Boubekker, "Bandwidth Reduction for the Transmission of Sign Language Over Telephone Lines", Proceedings of the SPIE—The International Society for Optical Engineering, vol. 1001, Part. 1, 1988, pp. 223-230.

S. Bramblett, "Connect Terminals to Your CPU Over PBX Telephone Lines", EDN, vol. 31, No. 5, Mar. 6, 1986, pp. 239-243, 245, 246 and 248.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

Grayson Evans, The CEBUs Standard User's Guide, 1st edition, May 1996, 317 pages.

Mark Hachman, Compaq to Ride the CEBus, EBN, Jan. 22, 1996, 1 page.

Home Automation Buses: Protocols Really Hit Home, EDN, Apr. 13, 1995, 9 pages.

Brian E. Markwalter, et al; CEBus Router Testing, IEEE Transactions on Consumer Electronics, Nov. 1991, vol. 37, No. 4, 8 pages.

J. Hofmann, Cable, Television, and the Consumer Electronic Bus, 9 pages.

Draft IS-60.04 Node Communications Protocol Part 6: Application Layer Specification, Rev. Apr. 18, 1996, 129 pages.

* cited by examiner

Figure 1 (Prior-Art)

Figure 2 (Prior-Art)

Figure 3 (Prior-Art)

Figure 4 (Prior-Art)

Figure 5 (Prior-Art)

Figure 6 (Prior-Art)

Figure 7 (Prior-Art)

Figure 8 (Prior-Art)

Figure 9 (Prior-Art)

TELEPHONE SYSTEM HAVING MULTIPLE DISTINCT SOURCES AND ACCESSORIES THEREFOR

CROSS REFERENCE TO RELATED APPLICATION

This is a continuation of U.S. application Ser. No. 10/492,411, which is a U.S. National-Phase Application of PCT/IL2004/000178, filed on Feb. 24, 2004, the disclosure of which is incorporated herein by reference.

BACKGROUND OF THE INVENTION

The present invention relates to the field of telephony systems within a house, used for home, office, enterprise or factory applications, connected to a network.

Telephony, Definitions and Background

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well designed and well-engineered for the transmission and switching of voice signals in the 3-4 KHz portion (or "voice-band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Telco operated Public Switched Telephone Network ("PSTN"), including apparatus for both analog and digital telephony, non-limiting examples of which are analog telephones, digital telephones, facsimile ("fax") machines, automatic telephone answering machines, voice modems, and data modems.

The term "network" herein denotes any system that allows multiple devices to send and receive information of any kind, wherein each device may be uniquely identified for purposes of sending and receiving information. Networks include, but are not limited to, data networks, control networks, cable networks, and telephone networks. A network according to the present invention can be a local area network (LAN) or part of a wide-area network, including the Internet.

Telephone System

FIG. 1 shows a typical telephone system installation in a house. The Figure shows a network 10 for a residence or other building, wired with a telephone line 14, which has a single wire pair that connects to a junction-box (not shown), which in turn connects to a Public Switched Telephone Network (PSTN) 11 via a cable ('local loop') 15a, terminating in a public switch, which establishes and enables telephony from one telephone to another. A plurality of telephones 13a and 13b may connect to telephone lines 14 via a plurality of telephone outlets 12a and 12b. Each outlet has a connector (often referred to as a "jack"), commonly being in the form of RJ-11 connectors in North-America. Each outlet may be connected to a telephone unit via a compatible "plug" connector that inserts into the jack.

Wiring 14 is normally based on a serial or "daisy-chained" topology, wherein the wiring is connected from one outlet to the next in a linear manner; but other topologies such as star, tree, or any arbitrary topology may also be used. Regardless of the topology, however, the telephone wiring system within a residence always uses wired medium: two or four copper wires terminating in one or more outlets which provide direct access to these wires for connecting to telephone sets.

Outlets

The term "outlet" herein denotes an electromechanical device that facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall. Non-limiting examples of common outlets include: telephone outlets for connecting telephones and related devices; outlets used as part of 'structured wiring' infrastructure (e.g. for Ethernet based network), telephone outlets for connecting telephone sets to the PSTN, CATV outlets for connecting television sets, VCR's, and the like; and electrical outlets for connecting power to electrical appliances. An outlet as used herein, can also be a device composed of a part that has a fixed connection to the wiring and is mechanically attached to, or mounted in, a wall, and a part that is removably mechanically attached and electrically connected to the first-mentioned part, i.e. a device in which the first part is a jack or connector used for both electrical connection and mechanical attachment. The term "wall" herein denotes any interior or exterior surface of a building, including, but not limited to, ceilings and floors, in addition to vertical walls. Telephone installation in recently built residential houses and common in offices is shown in FIG. 2, allowing for external multi-telephone lines connection and for various switching functionalities (e.g. intercom). The installation 20 is based on 'star' topology and employing PBX 12, having multiple telephone ports. Telephones 17a, 17b, 17c and 17d are each distinctly connected to a different PBX 12 ports via connections 21a, 21b, 21c and 21d respectively. The PBX 12 also provides three ports for incoming telephone lines 15a, 15b and 15c originated in the PSTN 11.

POTS Multiplexer

Typically each POTS telephone connection requires an independent wire pair. In the case wherein multiple telephone lines are carried between two points, many wire pairs are thus required. In order to allow for carrying multiple telephone services over several copper pairs, a POTS multiplexer system is commonly used (also known as DLC—digital Loop Carrier). Basically, the telephony signals are carried in digitized and multiplexed form over a cable comprising one or two wire pairs. Such a system is shown in FIG. 3, describing POTS multiplexer system 30 based on exchange side mux/demux 33 and customer side mux/demux 34, connected by two wires 32a and 32b. Telephone lines 31a, 31b, 31c and 31d from the PSTN 11 are connected to the exchange side mux/demux 33, wherein the incoming signals are digitized and multiplexed (commonly time multiplexed TDM, such as E1 or T1 systems), and transmitted over the wire pair 32 to the customer side mux/demux 34. The digitized telephony signals are demultiplexed and restored as analog POTS form, and fed to the respective telephone sets 17a, 17b, 17c and 17d via links 35a, 35b, 35c and 35d respectively, connected to the appropriate customer side mux/demux 34. The process is simultaneously applied in the telephone sets to PSTN direction, hence supporting full telephone service. WO 97/19533 to Depue teaches an example of such POTS multiplexer. Commonly, such prior art systems do not provide any switching functionality, and are mainly used for carrying multiple telephone signals from one point to another remote point. As such, cabling 35 is required from each telephone set 17 to the relevant port of customer side unit 34. Similarly, WO 01/28215 to Bullock et al. teaches a POTS multiplexer over power-lines.

WO 01/80595 to the same inventor of this application teaches a system allowing for reduced cabling requirements. The system 40 shown in FIG. 4 is based on 'distributed' customer side mux/demux 34. A PBX/MUX 12 connects to the PSTN 11 for multiple incoming telephone lines 15a, 15b and 15c, similar to the function of the exchange side mux/demux 33 of system 30. However, as a substitute to the single customer side mux/demux 34 multiple mux units 41 are provided. Telephone sets 17a, 17b and 17c are respectively coupled to mux units 41a, 41b and 41c. The mux units 41a, 41b, 41c and PBX/MUX 12 digitally communicate with each other, allowing each telephone set to connect to any of the incoming lines 15 or to another telephone set for intercom function. In such a way, there is no need to route new cable from each telephone set to a central place, but rather to a nearby mux unit 41.

Voice Over Internet Protocol (VoIP)

Recently, a solution for combining both telephony and data communications into a single network is offered by the Voice-over-Internet-Protocol (VoIP) approach. In this technique, telephone signals are digitized and carried as data across the LAN. Such systems are known in the art, and an example of such a system 50 is shown in FIG. 5. The system 50 is based on a Local Area Network (LAN) 53 environment, commonly using Ethernet IEEE802.3 standard interfaces and structure. The LAN can be used to interconnect computers (not shown) as well as other end-units, as well as IP telephone sets 54a, 54b and 54c shown. An example of IP telephone set 54 is Voice Service IP-Phone model DPH-100M/H from D-Link Systems, Inc. of Irvine, Calif., USA. IP-PBX unit 52 is also connected to the LAN and manages the voice data routing in the system. Many routing protocols are available, such as IETF RFC 3261SIP (Session Initiation Protocol), ITU-T H.323 and IETF RFC 2705 MGCP (Media Gateway Control Protocol). Examples of such a SIP based IP-PBX 52 is ICP (integrated Communication Platform) Model 3050 from Mitel Networks of Ottawa, Ontario Canada. Connection to the PSTN 11 is made via VoIP Gateway 55a, operative to convert an incoming analog POTS telephone signal to a digital and IP packet based protocol used over the LAN. An example of such VoIP Gateway 55 supporting four PSTN lines is MediaPack™ Series MP-104/FXO of AudioCodes Ltd. In Yehud, Israel. Such a system 50 allows for full telephone connectivity similar to performance of POTS PBX-based system (such as in FIG. 2). In most cases, such a network allows also for data networking (non-voice traffic), such as computers and peripherals, and connection to the Internet.

A VoIP MTA (Multimedia Terminal Adapter) is also known in the art, operative to convert IP protocol carrying telephony signals into POTS telephone set interface. Examples of such a VoIP MTA supporting four POTS telephone sets are MediaPack™ Series MP-104/FXS of Audio-Codes Ltd. In Yehud, Israel and two-ports Voice Service Gateway-model DVG-1120 from D-Link® Systems, Inc. of Irvine, Calif., USA. A system 60 shown in FIG. 6 demonstrates the use of such VoIP MTAs 64. The system 60 is identical to system 50, except for replacing the IP phones 54b and 54c with POTS telephone sets 17a and 17b. In order to enable the usage of these telephone sets 17a and 17b, respective VoIP MTAs 64a and 64b are added as the mediation devices between the analog telephony and the IP telephony. The addition of MTAs 64 allows for the same basic system functionality, although POTS telephones 17 are used rather than IP telephones 54. The combination of telephone set 17 connected to VoIP MTA 64 allows connection to an IP network, in the same manner that the IP telephone 54 is connected thereto, and providing similar functionality. EP 0824298 to Harper teaches an example a network conforming to such a system.

An example of the system 60 based on IP/Ethernet (IEEE802.3) LAN as internal network 53 is shown in FIG. 7 as system 70. The LAN comprises a switch 71 as a multi-port concentrating device in a 'star' topology wiring structure. It is understood that any type of device having multiple network interfaces and supporting a suitable connectivity can be used, non-limiting examples of which include a shared hub, switch (switched hub), router, and gateway. Hence, the term "switch" used herein denotes any such device. An example of the switch 71 is DSS-8+Dual-Speed 8-Port Desktop Switch from D-Link Systems, Inc. of Irvine, Calif., USA, having 8 ports. The network 70 comprises a dedicated cabling 73, such as Category 5 'Structured Wiring'. Such a network commonly uses 10BaseT or 100BaseTX Ethernet IEEE802.3 interfaces and topology. In such a network, outlets 72a, 72b and 72c are connected to the switch 71 via respective cables 73a, 73b and 73c. POTS Telephone sets 17a and 17b are connected via respective VoIP MTAs 64a and 64b to the respective outlets 72a and 72b, using connections 74a and 74b respectively. IP Telephone 54a connects directly (without VoIP MTA) via a connection 74c to the outlet 72c, which connects to a port in the switch 71 via cable 73c. The internal network connects to PSTN 11 via VoIP gateway 55a connected to another port of the switch 71, and IP-PBX 52 connects to another port of switch 71. Such a network allows for the telephones 17a, 17b and 54a to interconnect and also to connect to the external PSTN 11.

Home Networks

Implementing a network 70 in existing buildings typically requires installation of new wiring infrastructure 73. Such installation of new wiring may be impractical, expensive and hassle-oriented. As a result, many technologies (referred to as "no new wires" technologies) have been proposed in order to facilitate a LAN in a building without adding new wiring. Some of these techniques use existing wiring used also for other purposes such as telephone, electricity, cable television, and so forth. Doing so offers the advantage of being able to install such systems and networks without the additional and often substantial cost of installing separate wiring within the building. In order to facilitate multiple use of wiring within a building, specialized outlets are sometimes installed, which allow access to the wiring for multiple purposes. An example of home networking over coaxial cables using outlets is described in WO 02/065229 published 22 Aug., 2002 entitled: 'Cableran Networking over Coaxial Cables' to Cohen et al.

Other 'no new wire' technologies employ non-wired media. Some use Infrared as the communication medium, while others use radio frequency communication, such as IEEE802.11 and BlueTooth.

An example of a network 60 in a house based on using powerline-based home network implementing network 53 is shown as network 80 in FIG. 8. The medium for networking is the in-house power lines 81, which are used for carrying both the mains power and the data communication signals. For the sake of simplicity, the power related functions are not shown in the Figure. A PLC modem 82 converts data communication interface (such as Ethernet EEEE802.3) to a signal which can be carried over the power lines, without affecting and being affected by the power signal available over those wires. An example of such PLC modem 82 is Home- Plug1.0 based Ethernet-to-Powerline Bridge model DHP-100 from D-Link Systems, Inc. of Irvine, Calif., USA. D-Link is a registered trademark of D-Link Systems, Inc. PLCs 82a, 82b, 82c, 82d and 82e are all connected to the powerline 81 via the respective power outlets 88a, 88b, 88c, 88d and 88e, forming a local area network over the powerline allowing for data networking for the units connected thereto. The connection is commonly effected by a cord connected to a power outlet being part of the power line medium 81. Such a network 80 allows for the IP-PBX 52, PSTN 11 via VoIP gateway 55a, telephones 17a and 17b via the respective VoIP MTAs 64a and 64b and IP telephone 54a to communicate with each other, as well as to share external connection to the PSTN 11, as was offered by network 70. However, no additional and dedicated wiring is required.

Another home network medium may be the telephone wiring. It is often desirable to use existing telephone wiring simultaneously for both telephony and data networking. In this way, establishing a new local area network in a home or other building is simplified, because there is no need to install additional wiring.

The PLC modem 82 uses the well-known technique of frequency domain/division multiplexing (FDM), and provides means for splitting the bandwidth carried by a wire into a low-frequency band capable of carrying an analog telephony signal and a high-frequency band capable of carrying data communication or other signals. Examples of relevant prior-art in this field are the technology commonly known as HomePNA (Home Phoneline Networking Alliance), WO 99/12330 to Foley and as disclosed in U.S. Pat. No. 5,896,443 to Dichter (hereinafter referred to as "Dichter"). Dichter and others suggest a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal and the ADSL signals, and a high-frequency band capable of carrying home network communication signals. In such a mechanism, telephony and ADSL are not affected, while a home networking communication capability is provided over existing telephone wiring within a house.

WO 01/71980 published Sep. 27, 2001 entitled "Telephone Outlet and System for a Local Area Network Over Telephone Lines" and WO 03/005691 published Jan. 16, 2003 entitled "Telephone outlet with packet telephony adapter, and a network using same" both in the name the present inventor and assigned to the present assignee, and which are incorporated by reference for all purposes as if fully set forth herein, describe home networking over telephone wiring, based on outlets, which allows for conducting of digital telephony data as well as POTS and ADSL signals over in-house telephone wiring. Similarly, U.S. Pat. No. 6,130,893 to Whittaker et al. teaches an IP-based telephony network based on telephone wiring.

Many of the above figures and networks involve external connection to the PSTN to provide telephony services over telephone-dedicated wiring and owned by a telephone company. However, there are today multiple technologies for connecting premises to external telephone services, both terrestrial and via the air:
1. Cable television cabling, mostly coaxial cable based, used for delivering video channels, as well as broadband data and telephony to the house.
2. Satellite communication.
3. Power lines communication, wherein the power lines carrying power to the house are also used for data communication.
4. Wireless communications using radio frequency such as cellular, LMDS and many other wireless technologies.
5. Fiber, such as Fiber-To-The-Home (FTTH) or other similar technologies.

The availability of plural telephone service providers, each using a different access medium, allows for a house dweller, for example, to have multiple telephone lines from different providers. For example, a telephone line may be available from the CATV provider, added to the traditional telco oriented telephone line.

Common to all above prior art systems, the incoming telephone lines into the house are connected to a single unit: PBX 12 of system 20 in FIG. 2, exchange side mux/demux 33 of system 30 in FIG. 3, PBX/MUX 12 of system 40 in FIG. 4 and VoIP gateway 55a of systems 50 and 60 in FIGS. 5 and 6, respectively. However, the additional telephone line, for example from the CATV provider, may be available in a distinctly different place. An example of system 20 modified to support both telco (PSTN) and CATV originated telephone lines is shown as system 90 in FIG. 9. In addition to connections to the PSTN 11, an incoming telephone line from CATV network 91 via VoIP gateway 55b is shown. Typically the VoIP gateway is integrated into a cable-modem or set-top-box, and connects to the CATV network 91 via a CATV outlet, connecting to the coaxial cable wiring installation. Since in most cases the VoIP gateway 55b is not located near the PBX 12, there is a need to install new cable 92 from the VoIP gateway 55b to a port in the PBX 12. Such installation is expensive, time consuming and not aesthetic.

There is thus a widely recognized need for, and it would be highly advantageous to have, a method and system for allowing easy and minimum cabling structure for sharing the telephony service from multiple sources or being fed at distinct locations. This goal is met by the present invention.

BRIEF SUMMARY OF THE INVENTION

The invention discloses a data communication network carrying digitized telephone signals, such as VoIP based network. Digital telephones (such as IP telephones in VoIP environment) can be coupled to the network, as well as POTS telephone sets via respective adapters (e.g. VoIP MTA). The network is coupled to multiple telephone services, each connected to a distinct point in the network. For example, in case of wired network, the services may be coupled to different places of the wiring medium. Similarly, the services can be coupled to different devices in the network. The telephone service signal is either of digital type and thus directly connected to the data network, or of POTS analog type, requiring respective adapter (e.g. VoIP gateway). A routing means (e.g. IP-PBX) provides the required routing of the digitized telephone signal between all telephone related equipment connected to the network: telephone sets and telephone services.

The data network may use either dedicated wiring (such as in Ethernet 'structured wiring' systems) or wiring used for other services, such as telephone, CATV or power carrying pair. The network comprises modems for communicating over the wiring medium. The access to the network wiring may use outlets. The telephone services may use different media such as PSTN, CATV, wireless or cellular telephone networks.

The invention further describes an apparatus for coupling a telephone service to the data network. Such apparatus comprises a modem for data communication over the network medium. In the case of coupling to analog based telephone service, the apparatus may also comprise a VoIP gateway for converting the analog telephone service signal to digital. The apparatus may also comprise a multi port connectivity device allowing for data unit (or digital telephone) to access the network by sharing the same modem. The apparatus may further comprise an adapter for connecting POTS telephone set to the network via the apparatus. In another embodiment the apparatus comprises a routing means. In the case wherein the network medium also carries another service (such as POTS telephony, CATV or power), the apparatus may comprise a service dedicated means to separate the service signal from the data communication signal, and to provide access (e.g. via the standard service connector) to the service.

The apparatus may be integrated into an outlet. The outlet may be telephone outlet, CATV outlet or power outlet relating to using the respective telephone, CATV and power wiring as the network medium.

The telephone service may be a mobile telephone service, such as wireless or cellular telephone network. In such a case, an associated adapter is required to access the telephone service. In one embodiment, a mobile or cellular telephone set is used to communicate with the respective mobile or cellular telephone network. The mobile (or cellular) telephone set can be a detachable device, allowing the user the option to use it as a mobile unit or as access to the disclosed system.

BRIEF DESCRIPTION OF THE DRAWINGS

The invention is herein described, by way of non-limiting example only, with reference to the accompanying drawings, wherein.

DETAILED DESCRIPTION OF THE INVENTION

Figure 1:
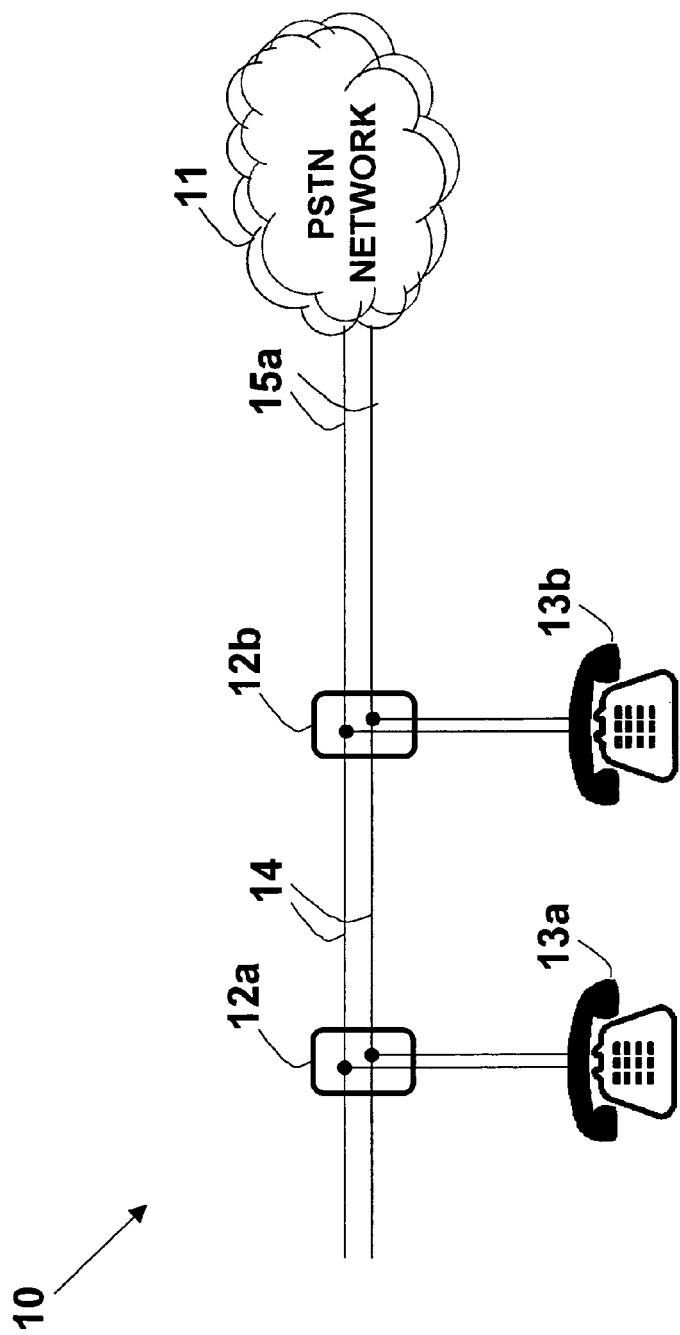
FIG. 1 shows a prior art in-house telephone installation having daisy-chain topology.
Figure 2:
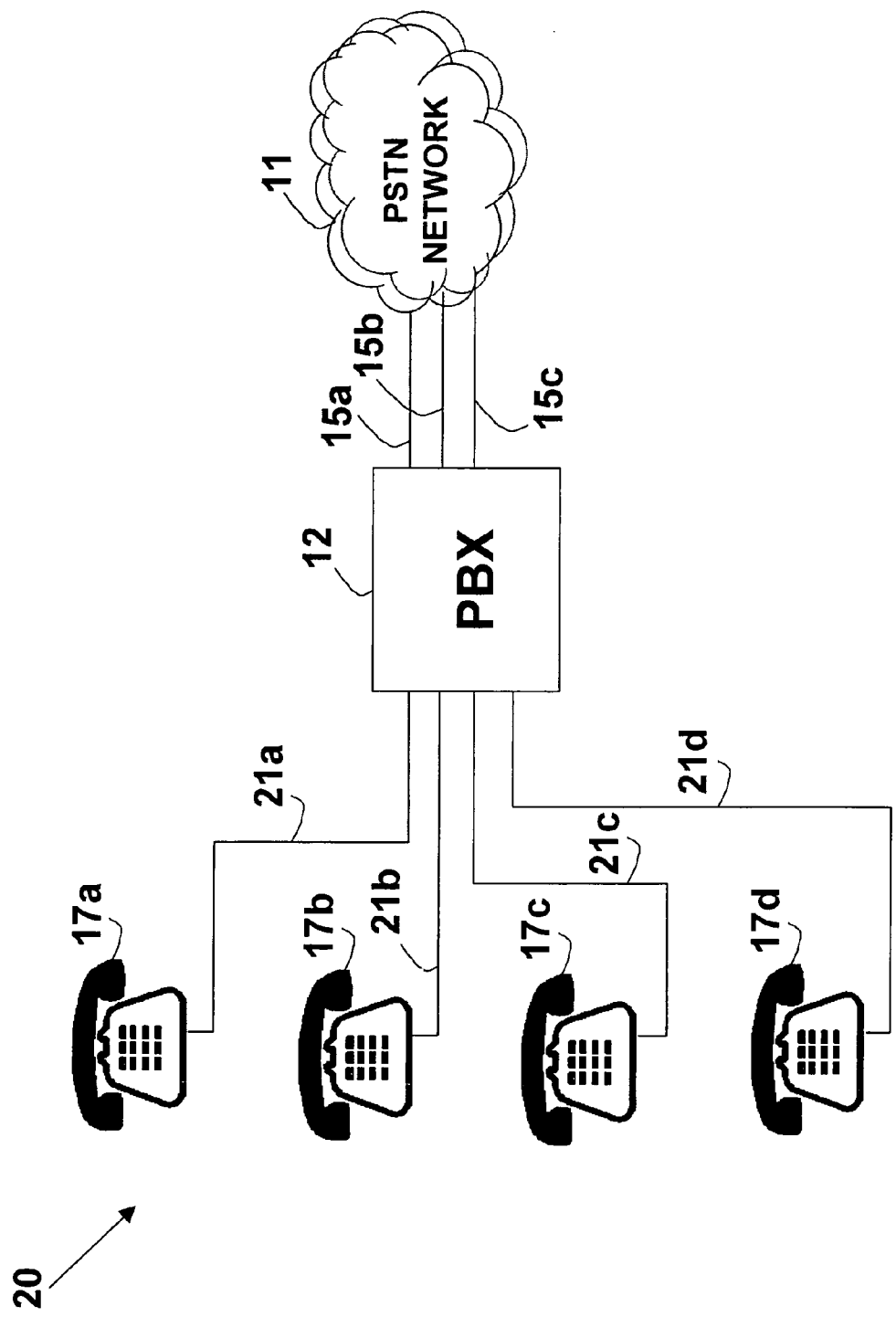
FIG. 2 shows a prior art in-house PBX-based telephone installation.
Figure 3:
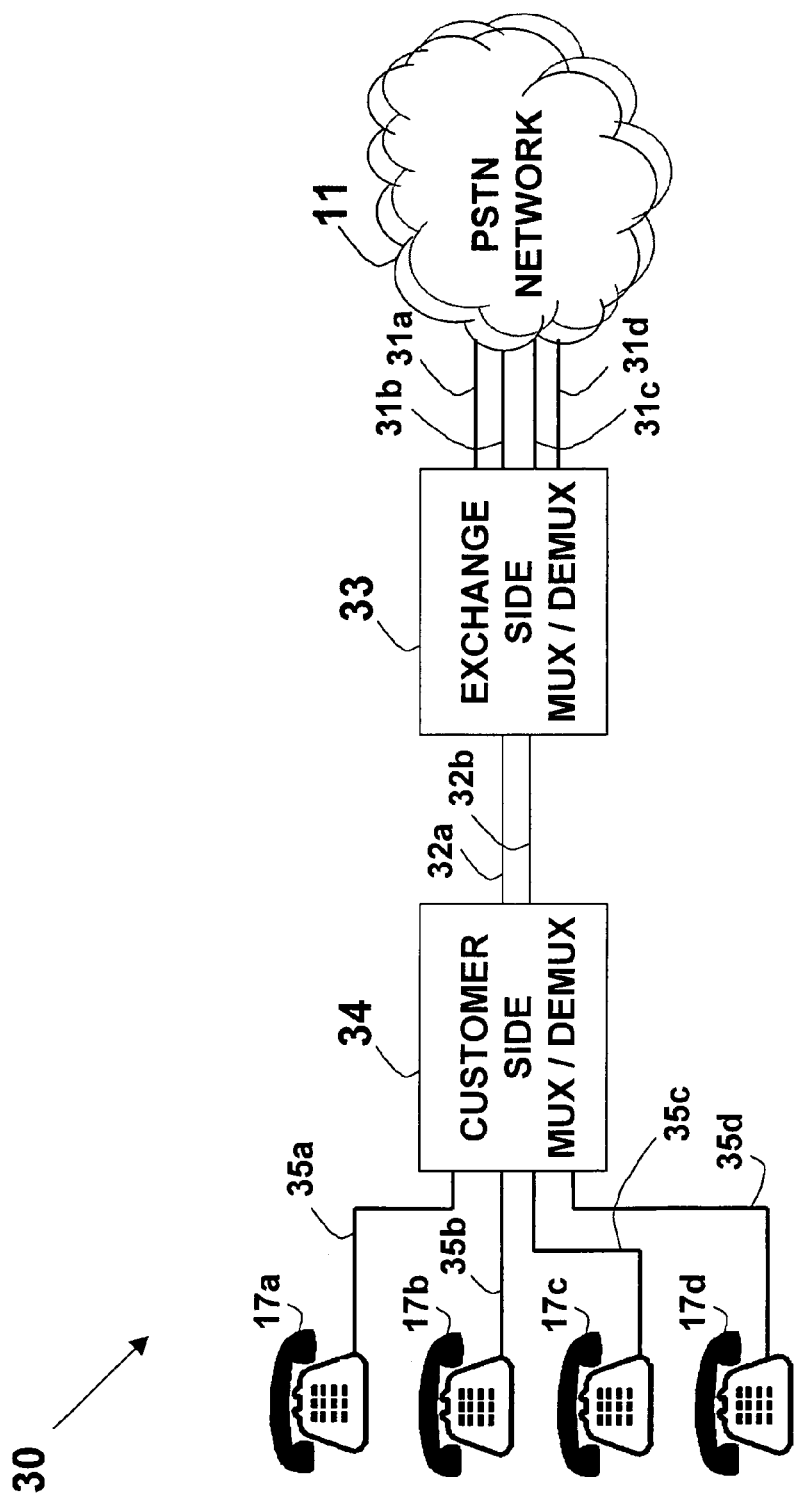
FIG. 3 shows a prior art POTS multiplexer (DLC) system.
Figure 4:
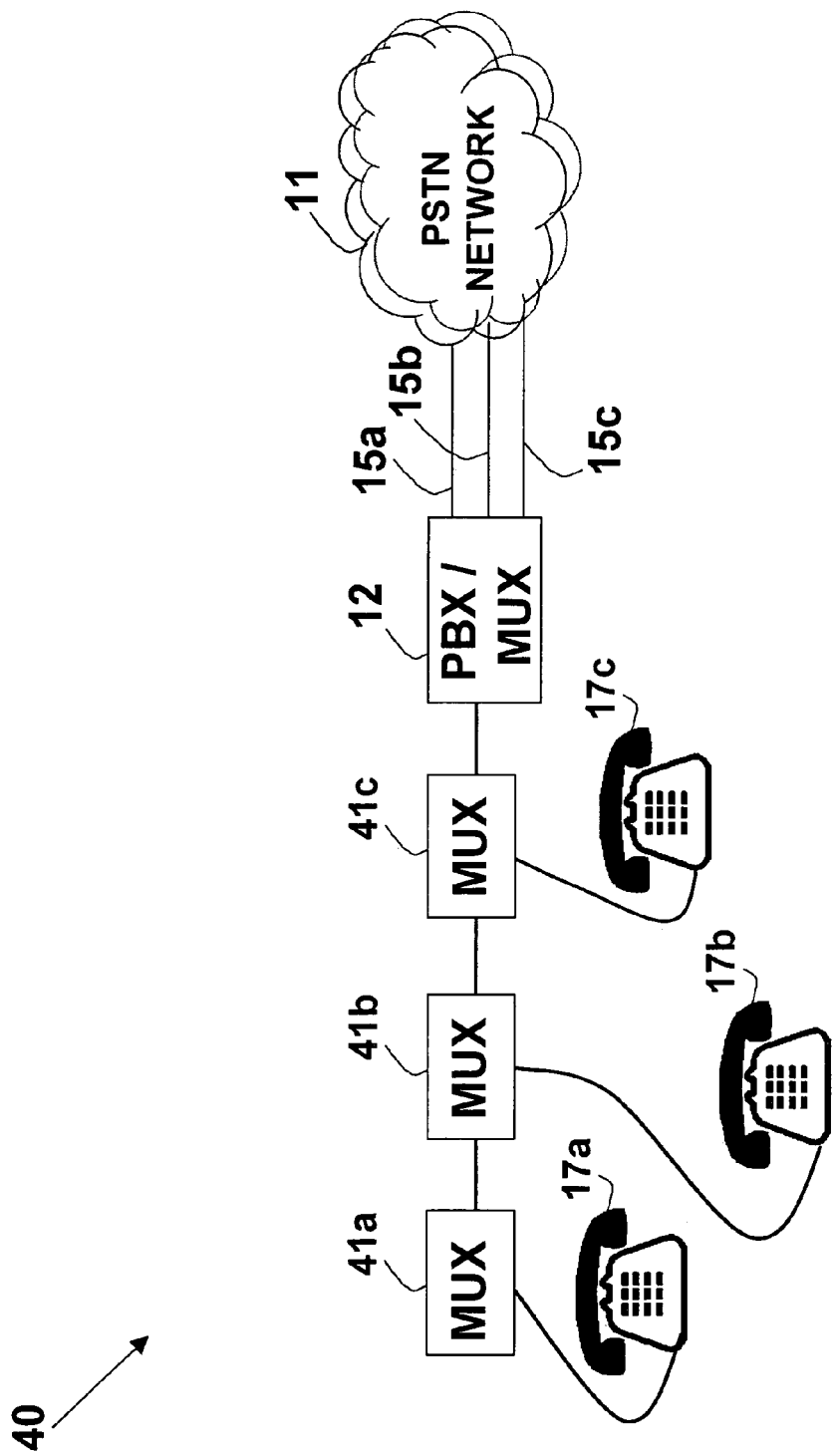
FIG. 4 shows a prior art telephone system allowing for distributing multiple telephone lines to multiple telephone sets using minimum cables.
Figure 5:
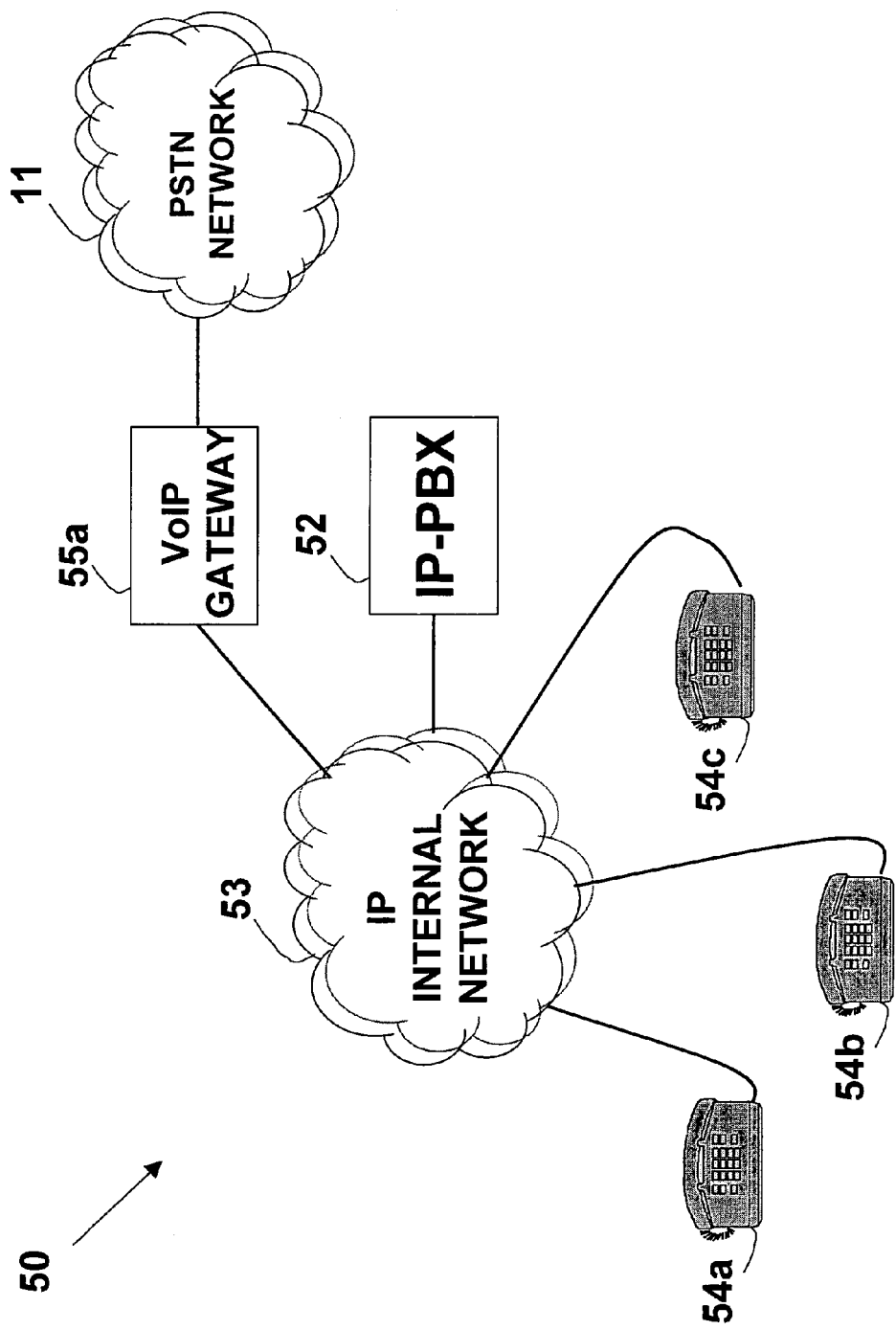
FIG. 5 shows a general prior-art VoIP network connected to a PSTN.
Figure 6:
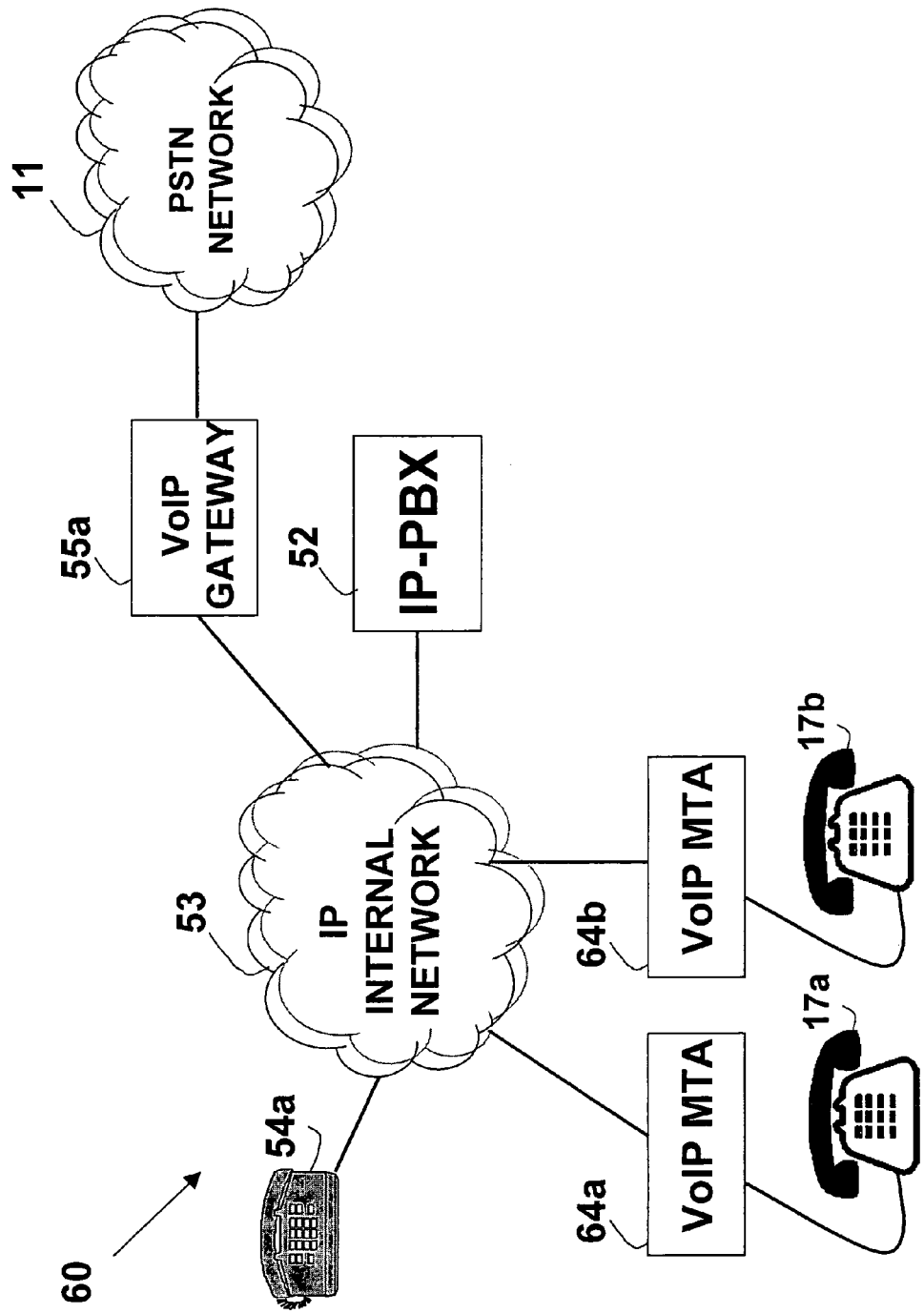
FIG. 6 shows a general prior-art VoIP network connected to a PSTN and using POTS telephone sets.
Figure 7:
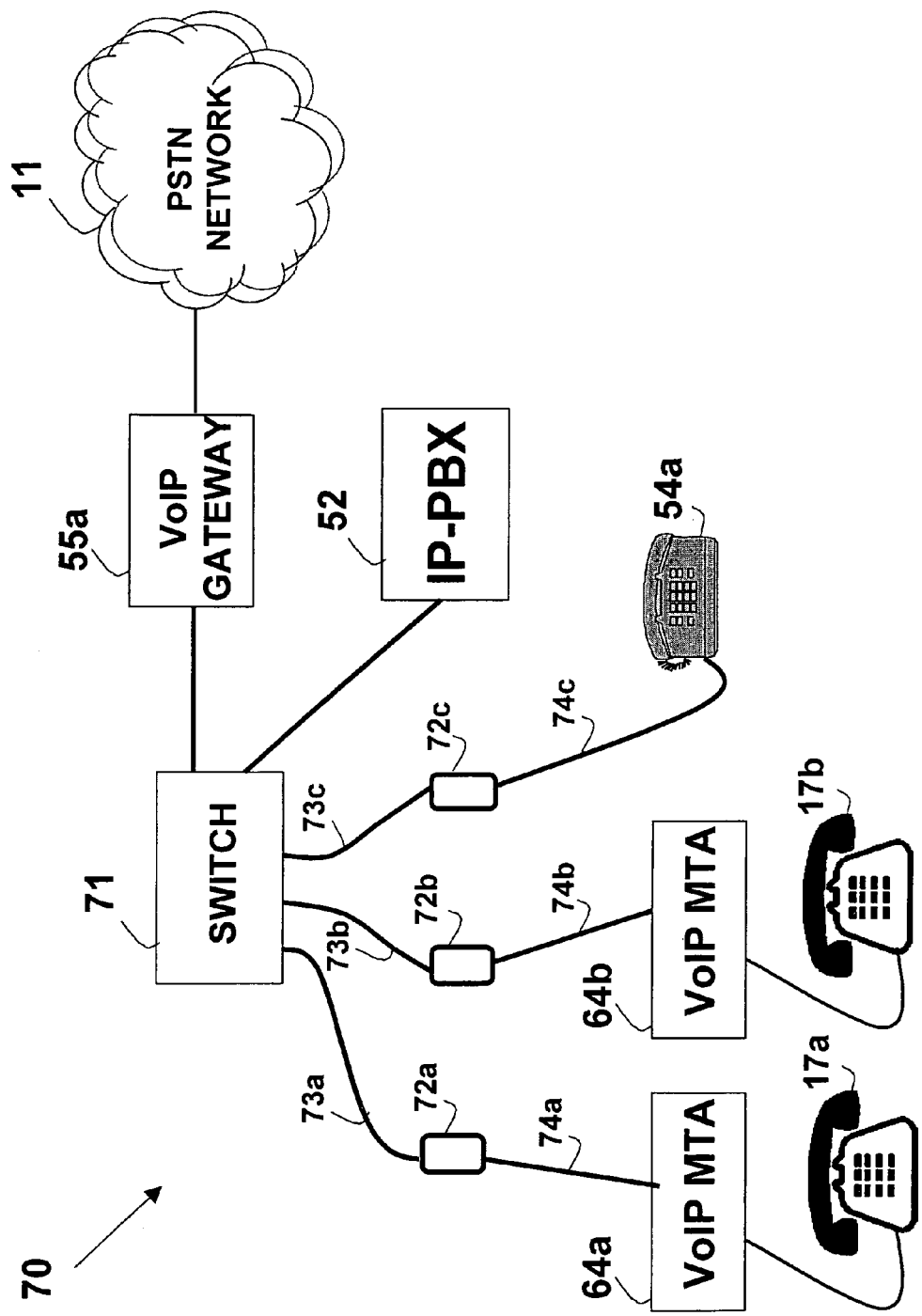
FIG. 7 shows a general prior-art structure-wiring Ethernet based VoIP network connected to a PSTN and using POTS telephone sets.
Figure 8:
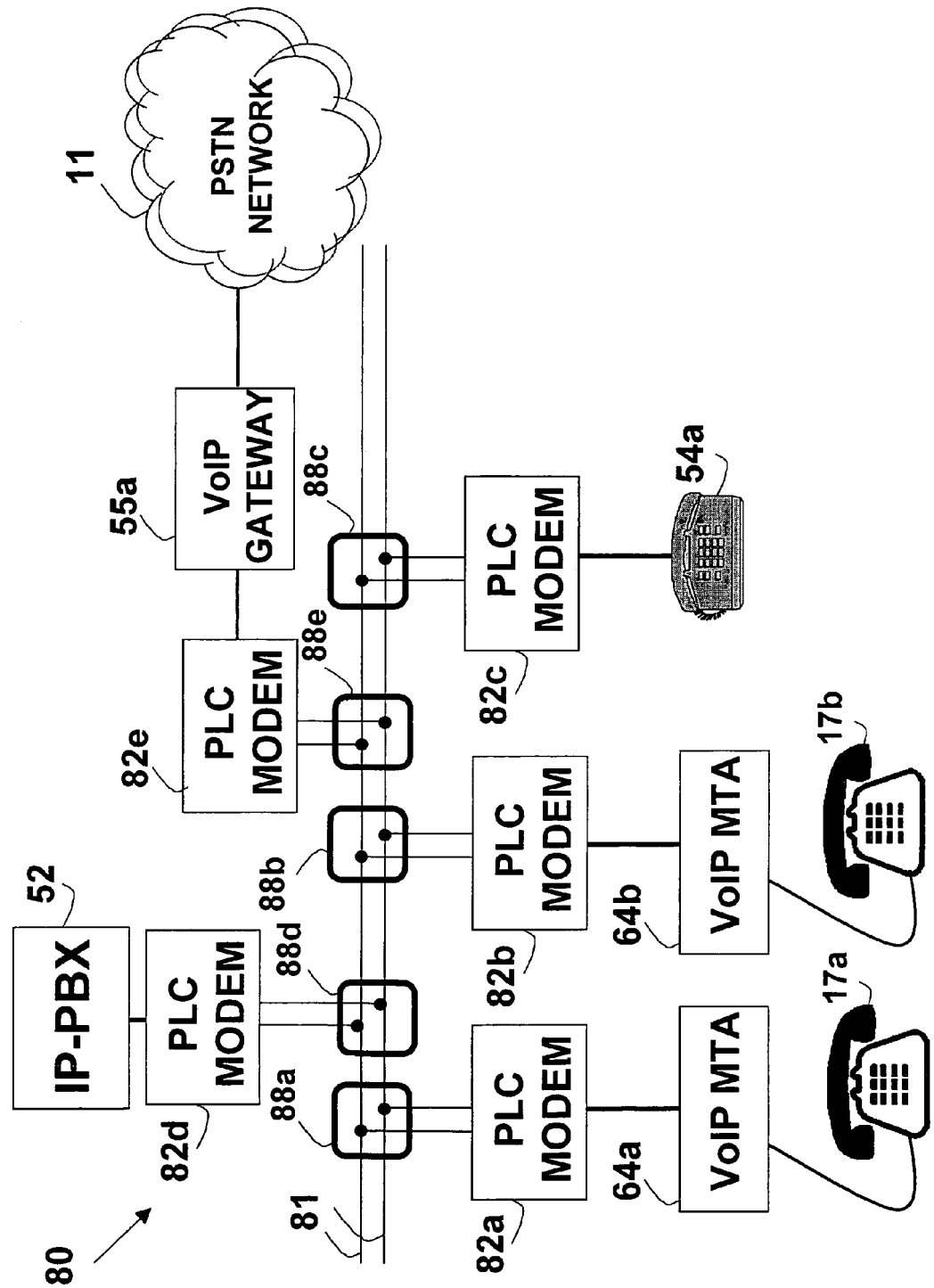
FIG. 8 shows a prior-art power lines based VoIP network connected to a PSTN and using POTS telephone sets.
Figure 9:
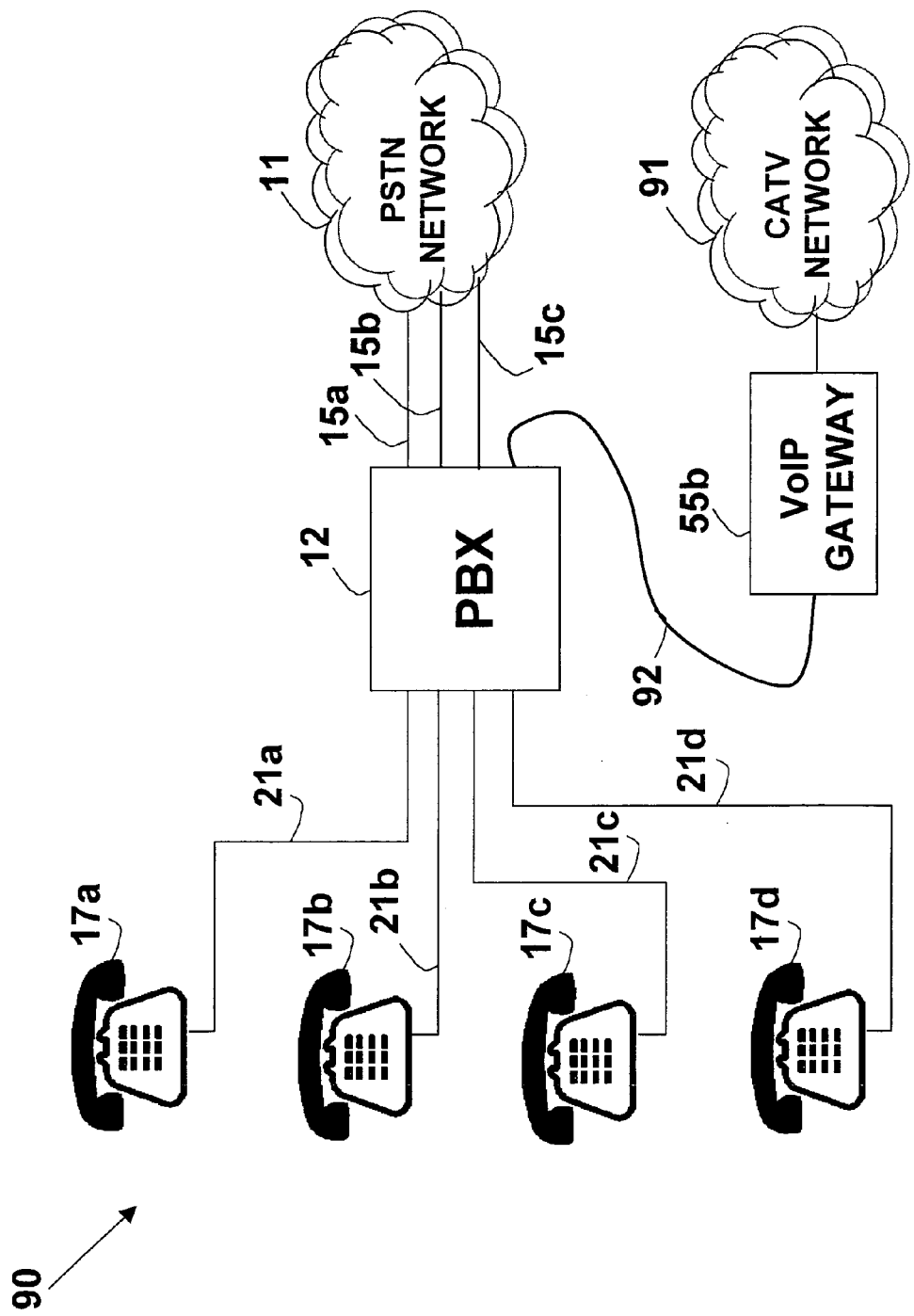
FIG. 9 shows a prior art in-house PBX-based telephone installation connected to both PSTN and CATV network.

The principles and operation of a network and system according to the present invention may be understood with reference to the drawings and the accompanying description. Many of the systems that are described below are based on the networks described above with reference to FIGS. 1 to 9 of the drawings, which in some cases show systems comprising more than one interconnected network. In the following description the term "system" is used to denote a composite network based on the interconnection of more than one network. In such a system, the component networks can themselves be composite networks. To this extent, the terms "network" and "system" are used interchangeably. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 10:
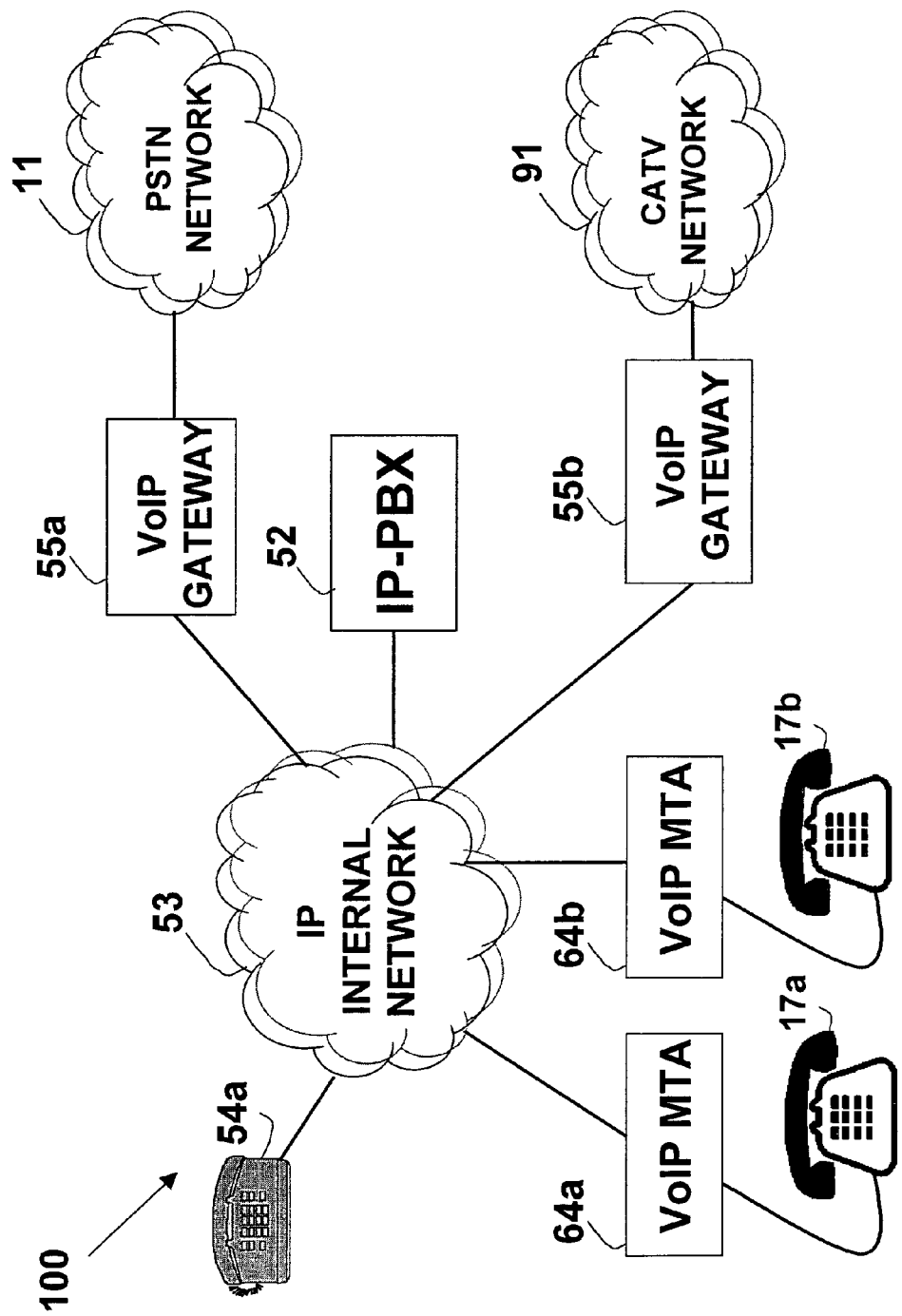
FIG. 10 shows a general VoIP network according to the present invention connected to PSTN and CATV networks.

The principle of the invention is shown as system 100 in FIG. 10. System 100 shown is based on the network 60 in FIG. 6. The network 60 is modified to include an additional incoming telephone line from a CATV network 91, constituting a second telephone service provider, via a VoIP gateway 55b. It should be noted that the incoming telephone line from the VoIP gateway 55a and the data signal representing the incoming telephone line from the VoIP gateway 55b are connected to the network at distinct and different points, and each of the above-mentioned incoming telephone lines connects to a distinct and different device in the network. The telephone associated packets in the network are routed and managed by the IP-PBX 52 to allow full voice connectivity, allowing for incoming telephone calls from the PSTN 11, constituting a first telephone service provider, and CATV network 91 to be routed to any of the telephone sets 17a, 17b and 54a as required, as well as forwarding outgoing calls from the telephone sets to the two external networks as required.

Figure 11:
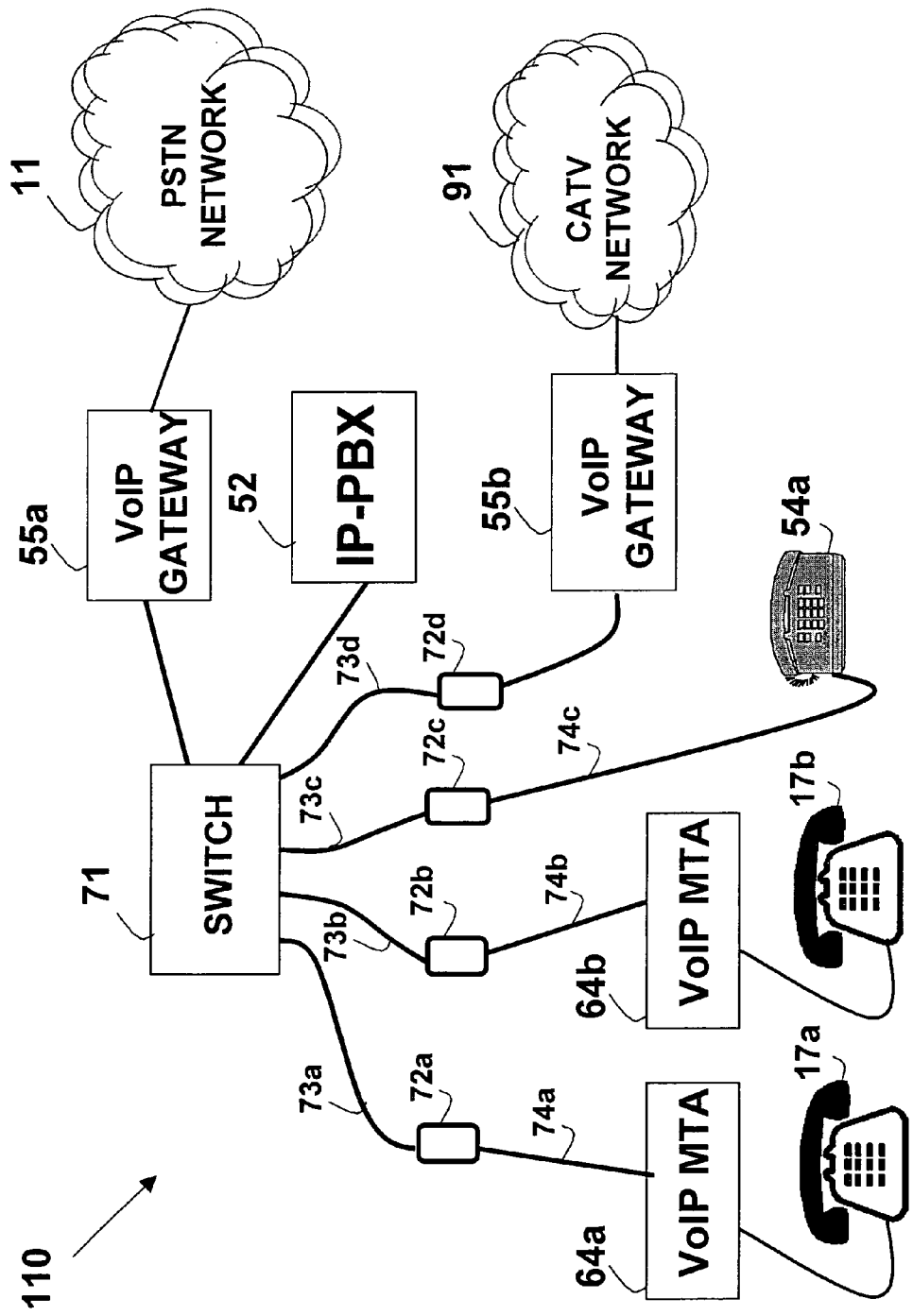
FIG. 11 shows a structure-wiring Ethernet based VoIP network according to the present invention.

A system according to a first embodiment of the invention is shown in FIG. 11. The system 110 is basically similar to the prior-art network 70. However, CATV network 91 is added providing an additional telephone line, whose signal is converted to a digital form by a VoIP gateway 55b. The VoIP gateway 55b connects to the network by outlet 72d, which in turn connects to the switch 71 via cable 73d. The IP-PBX 52 serves as a router for routing telephone calls between the PSTN 11, CATV network 91, IP Telephone 54a and POTS sets 17a and 17b. It should be noted that CATV network 91, via its respective VoIP gateway 55b, connects additional external telephone lines to the network 110, and connects to the network via outlet 72d, being a distinct and different point of connection from the PSTN 11. Furthermore, each of the above external networks: PSTN 11 and CATV network 91 each is connected to a distinct respective VoIP gateway device 55a or 55b.

As can be demonstrated in FIG. 1, while the PSTN 11 is coupled to switch 71 via VoIP gateway 55a, the CATV network 91 is coupled to the network wiring 73d via outlet 72d, being distinct and different point of the network medium. Furthermore, while PSTN 11 connects to VoIP gateway 55a, the CATV network 91 connects to VoIP Gateway 55b, which may be a distinct and different device.

Figure 12:
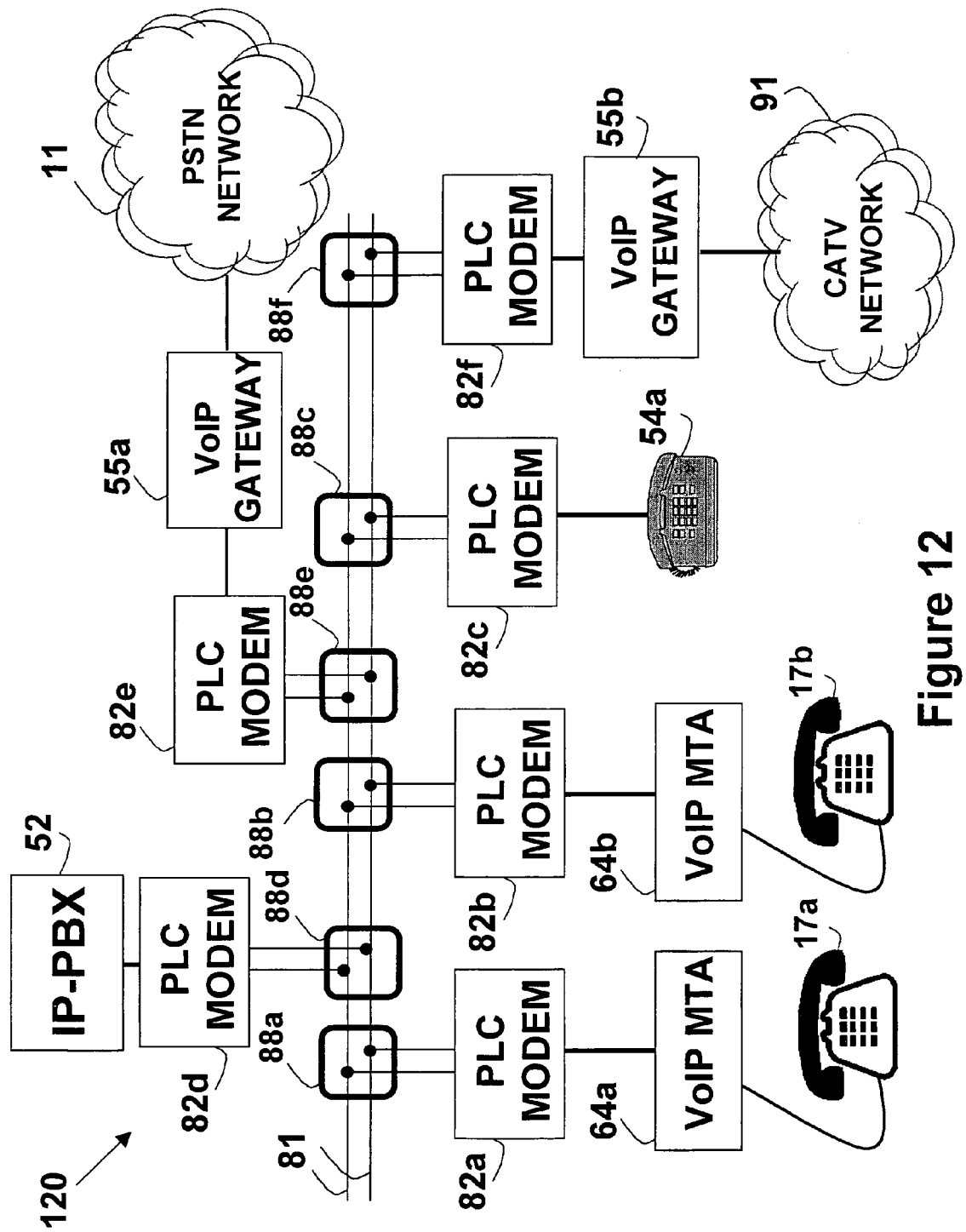
FIG. 12 shows a power lines based VoIP network according to the present invention.

While system 110 is based on dedicated wiring as the networking medium, the invention can be equally applied to home networking using existing in-house wiring. Such a network 120 is shown in FIG. 12 and is based on the powerline-based network 80 of FIG. 8. While network 80 connects solely to the external PSTN 11, system 120 allows for the addition of the CATV network 91 as a source for an external telephone line. VoIP Gateway 55b converts the telephone signal carried by the CATV network 91 to digital IP based signal, which in turn connects to the powerline medium 81 via PLC modem 82f. In this case, the IP network 53 of system 100 is implemented by the powerline medium 81 together with the multiple PLC modems 82 connected thereto.

As can be seen in FIG. 12, while the PSTN 11 is coupled to the network medium 81 outlet 88e via PLC modem 82e and VoIP gateway 55a, the CATV network 91 is coupled to the network wiring 81 via outlet 88f, constituting a distinct and different point of the network medium. Furthermore, while PSTN 11 connects to VoIP gateway 55a, the CATV network 91 connects to VoIP Gateway 55b and PLC modem 82f, which may be distinct and different devices.

Figure 13:
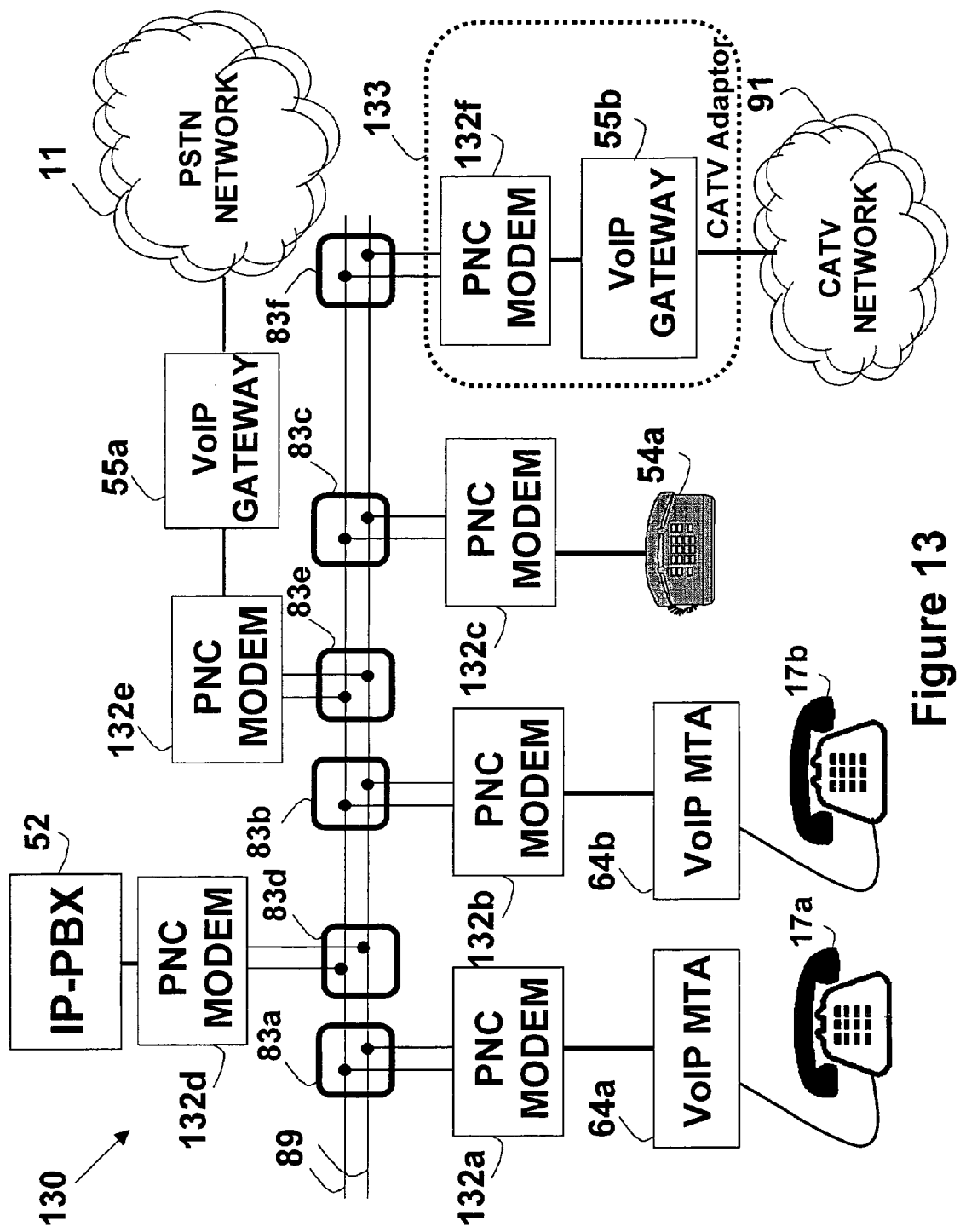
FIG. 13 shows a phone lines based VoIP network according to the present invention.

An additional embodiment of the invention over an in-house wiring IP network is shown as system 130 in FIG. 13. While the system 130 shown is similar in its configuration to system 120, system 130 uses telephone wiring 89 (rather than powerlines 81) as the communication medium. In order to allow such networking all PLC modems 82 of system 120 are substituted with PNC (PhoNe wiring Communication) modems 132. Examples of PNC 132 are model TH102-A 10+ Mbps Home Phoneline to Ethernet Converter from Compex Inc, of Anaheim, Calif. USA and based on HomePNA2.0 and Model HG-101B Ethernet to 1 Mbps HomePNA Converter from Netronix Inc. of HsinChu, Taiwan. Such modems are known in the art to carry data communication signals over the telephone line without interfering with the POTS telephone signal carried over the same wires using the lower spectrum. The telephone wiring 89 can be configured in three distinct options:

Not carrying any POTS signals. In this configuration, the telephone wiring used for the data networking is not used for carrying any analog POTS signal. This can be the case wherein multiple pairs are available, and one is selected solely for the data communication purpose.

Figure 14:
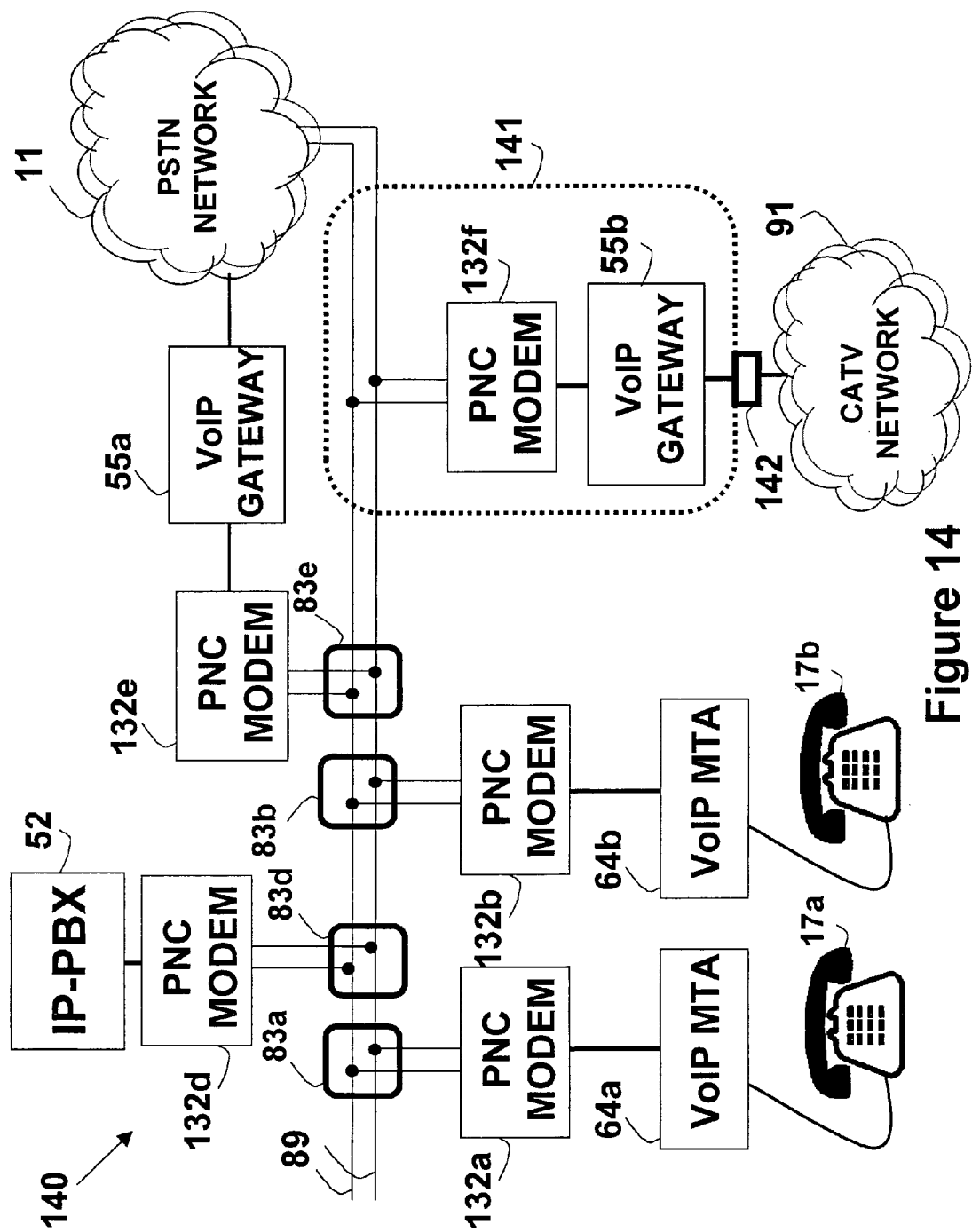
FIG. 14 shows an outlet and phone lines based VoIP network according to the present invention.

Carrying PSTN originated POTS signal. In this installation, the telephone pair 89 is used to also carry PSTN 11 originated POTS telephony signal as shown in FIG. 14. The same telephone line can also be connected to the VoIP gateway 55a to be carried in a digital form within the network. This configuration can support 'life-line' functionality, wherein the basic telephone service is required to exist even in the case of power outage.

Figure 15:
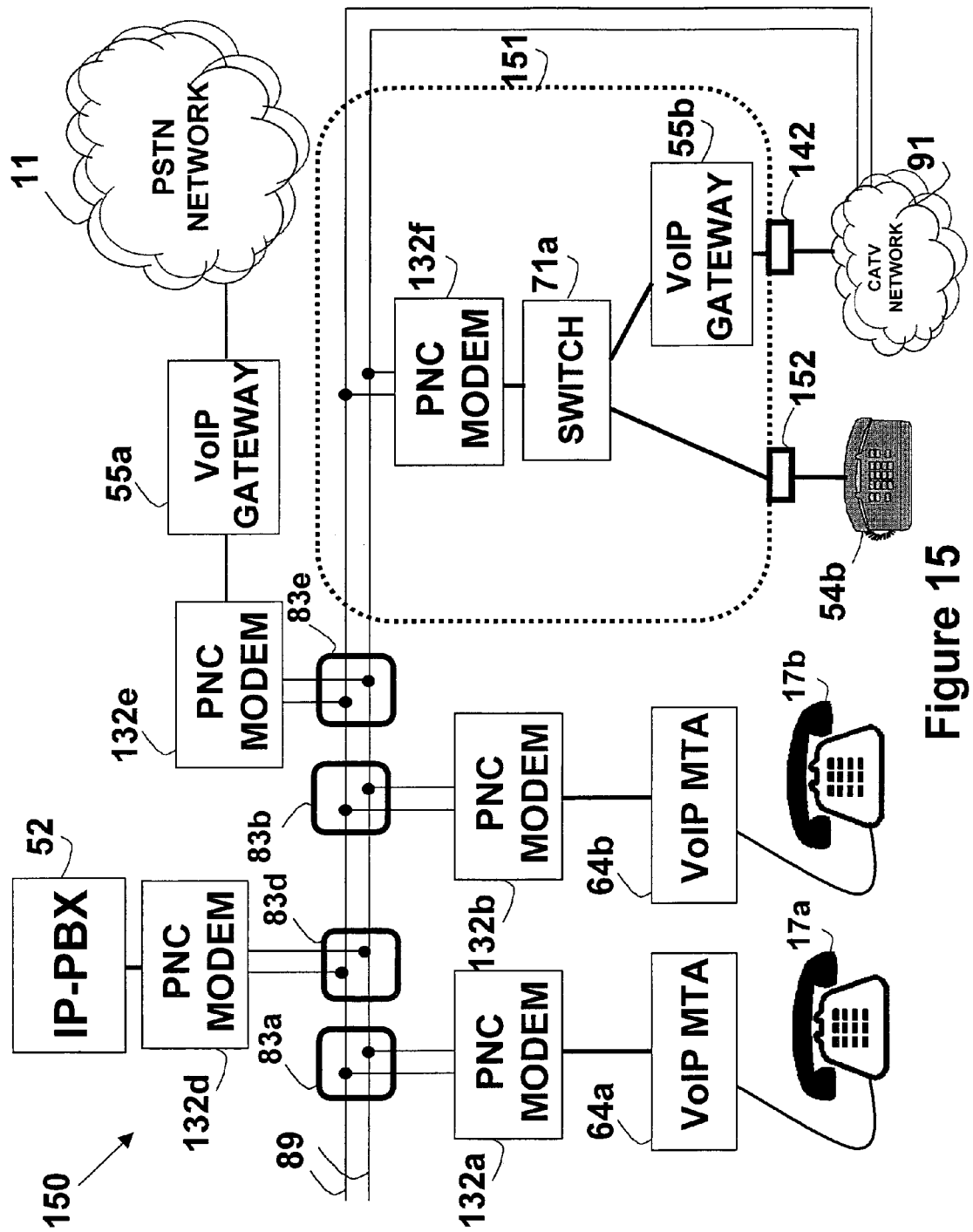
FIG. 15 shows an outlet and phone lines based VoIP network according to the present invention, wherein the outlet further allows for WP telephone connection.

Carrying non-PSTN originated POTS signal. Similar to (b), POTS signal is also carried over the telephone pair 89. However, such telephone service is originated from a source other than the PSTN 11. Any POTS telephone line can use the pair 89, and in particular the POTS line originated by CATV network 91, as shown in FIG. 15.

As can be seen in FIG. 13, while the PSTN 11 is coupled to the network medium 89 outlet 83e via PNC modem 132e and VoIP gateway 55a, the CATV network 91 is coupled to the network wiring 89 via outlet 83f, being a distinct and different point of the network medium. Furthermore, while PSTN 11 connects to VoIP gateway 55a, the CATV network 91 connects to VoIP Gateway 55b and PNC modem 132f, which may be distinct and different devices. While systems 120 and 130 in FIGS. 12 and 13, respectively describe powerline and phone line based home networks respectively, it should be appreciated that the invention can be equally applied to any other type of home network, such as CATV coaxial based and non-wired systems. For example, in the case of using CATV coaxial cable as the communication medium, the powerline 81 will be replaced with the coaxial cable, and the PLC modems 82 will be substituted with equivalent coaxial cable modems. Similarly, for the case of wireless home network, the PLC modems 82 will be substituted with Radio Frequency transceivers. As such, any reference to a PNC modem 132 and telephone wire pair 89 hereinafter will be understood to represent any other networking technology and medium.

Outlet

Figure 16:
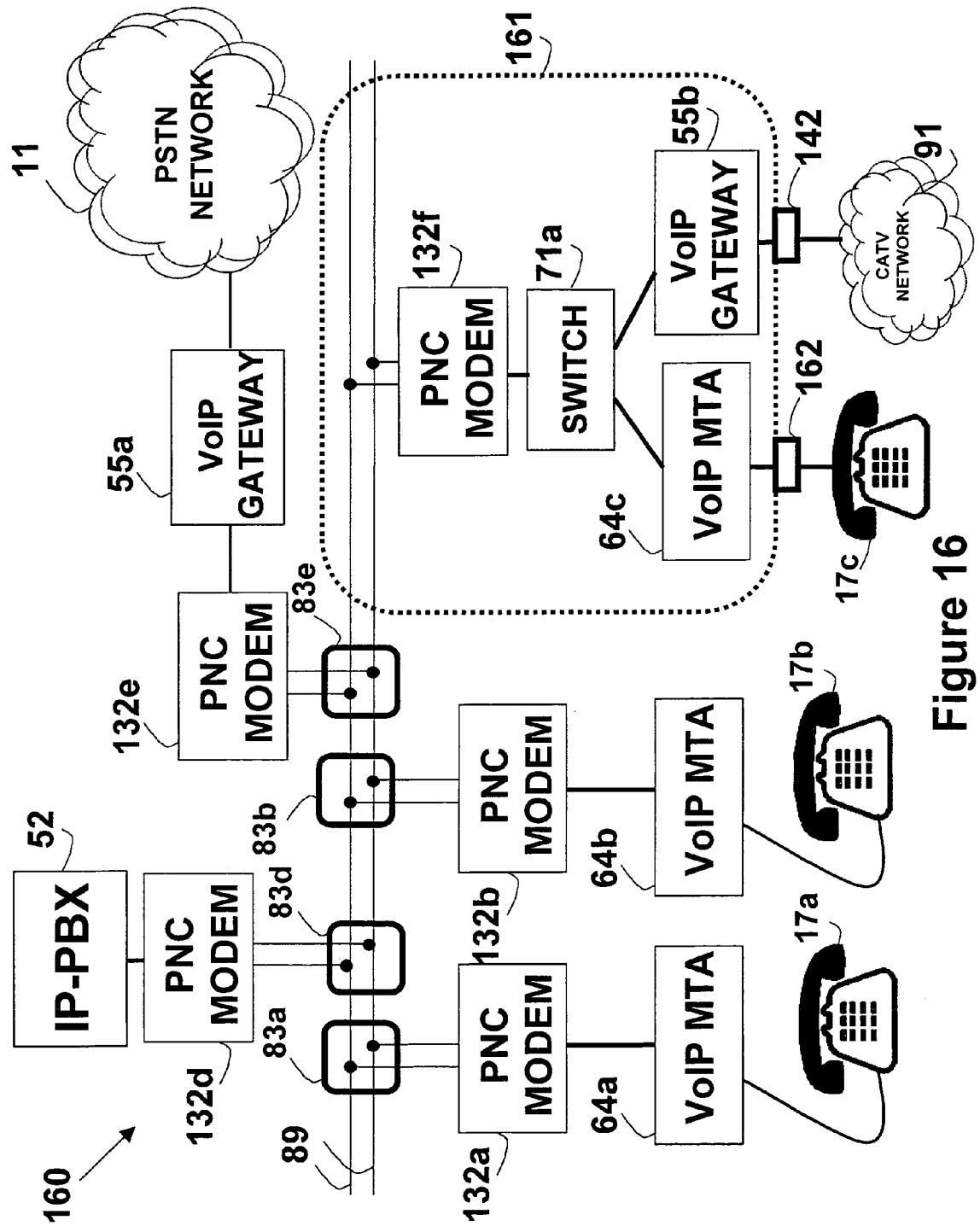
FIG. 16 shows an outlet and phone lines based VoIP network according to the present invention, wherein the outlet further allows for POTS telephone connection.
Figure 17:
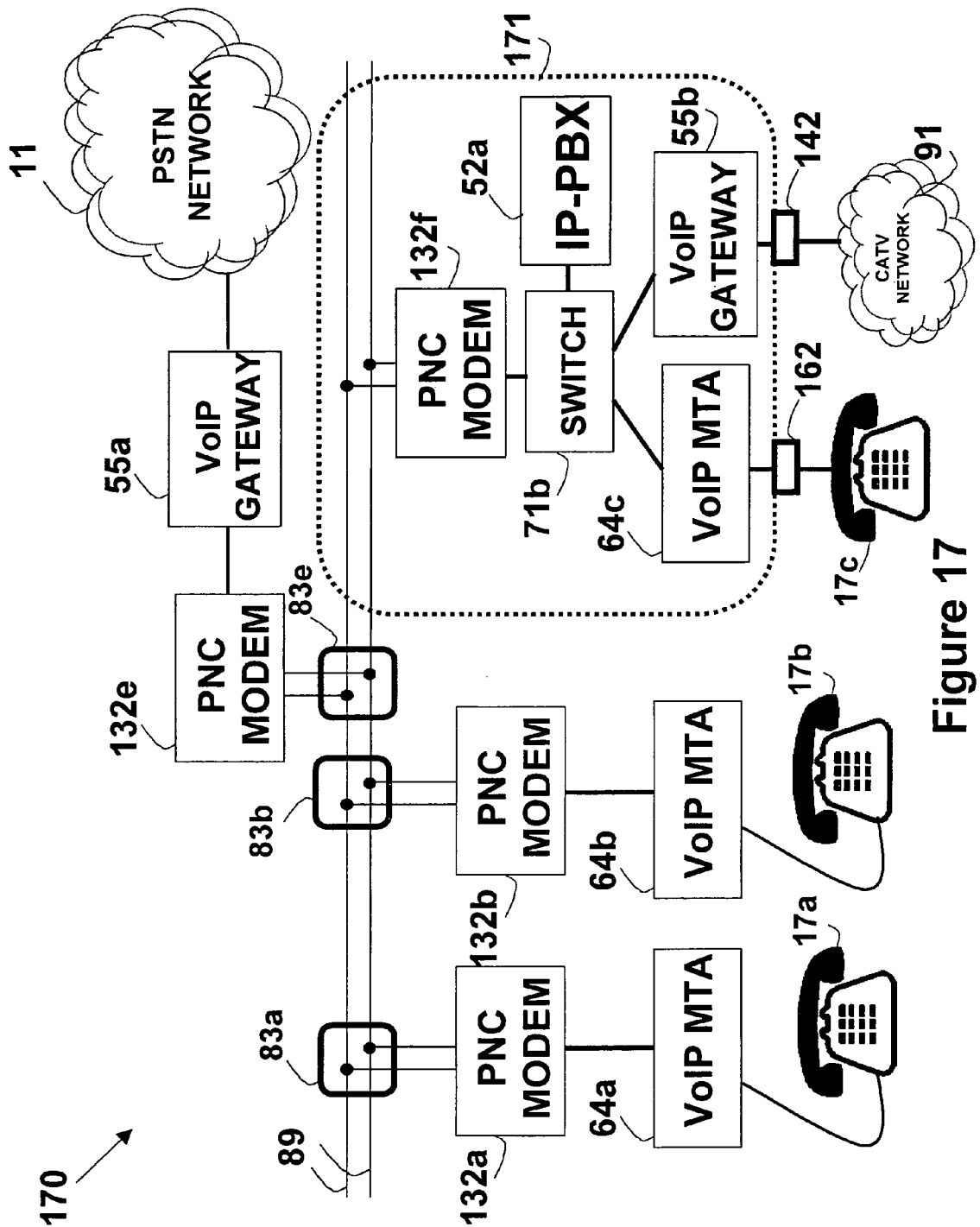
FIG. 17 shows an outlet and phone lines based VoIP network according to the present invention, wherein the outlet further allows for POTS telephone connection and includes IP-PBX functionality.

In order to save space, cost and to allow easy installation and operation it is commonly advised to integrate multiple functions into a single device. Specifically relating to system 130, the VoIP Gateway 55b and the PNC modem 132f may be integrated into a device designated as CATV adapter 133 shown in FIG. 13. Such an adapter 133 supports one port for connection to a telephone line originated in the CATV network 91, and the other port connects to the telephone wire pair 89 via outlet 83f. Further savings in space, cost and complexity can be achieved by integrating functions into a telephone outlet. Such a structure is illustrated in system 140 of FIG. 14, wherein the CATV adapter 133 is integrated to compose telephone outlet 141. The outlet 141 connects to the telephone wiring 89 in a way similar to connecting any outlet to the wiring, and has a port 142 for connection to CATV network 91, preferably on the faceplate of the outlet. Outlet 141 supports single external port 142, and hence offers limited functionality. An improved outlet 151, supporting dual functions, is illustrated in FIG. 15 as part of system 150. Rather than direct connection between the VoIP gateway 55b and the PNC modem 132f of outlet 141, outlet 151 provides a switch unit 71a in between the gateway 55b and the modem 132f. The switch 71a represents any multi-port networking unit, such as a hub, switched hub or router. Two of the ports are used to allow for connection of the gateway 55b to the PNC modem 132f, thus preserving the functionality of outlet 141. However, additional port is used for connecting external units to the network via connection 152. In system 150, the port 152 is used to connect an IP telephone 54b to the IP network, in addition to its role of connectivity to CATV network 91. Similarly, outlet 161, shown as part of system 160 in FIG. 16, supports connection of a POTS telephone set 17c rather than IP telephone set 54b of outlet 151. A VoIP MTA 64c is added between a dedicated port 162 and the switch 71a, allowing for connection of the analog set 17c to the IP network. In another embodiment according to the invention, an outlet 171 shown as part of system 170 in FIG. 17 also comprises IP-PBX 52a functionality, obviating the need for a distinct device 52 (along with its associated PNC modem 132d). As such, outlet 180 provide four distinct functionalities: incoming telephone line connection 142, POTS telephone set connection 162, IP telephone set connection 152 and IP-PBX function 52a. According to the present invention, any one or more of the above four functions can be implemented in an outlet.

Figure 18:
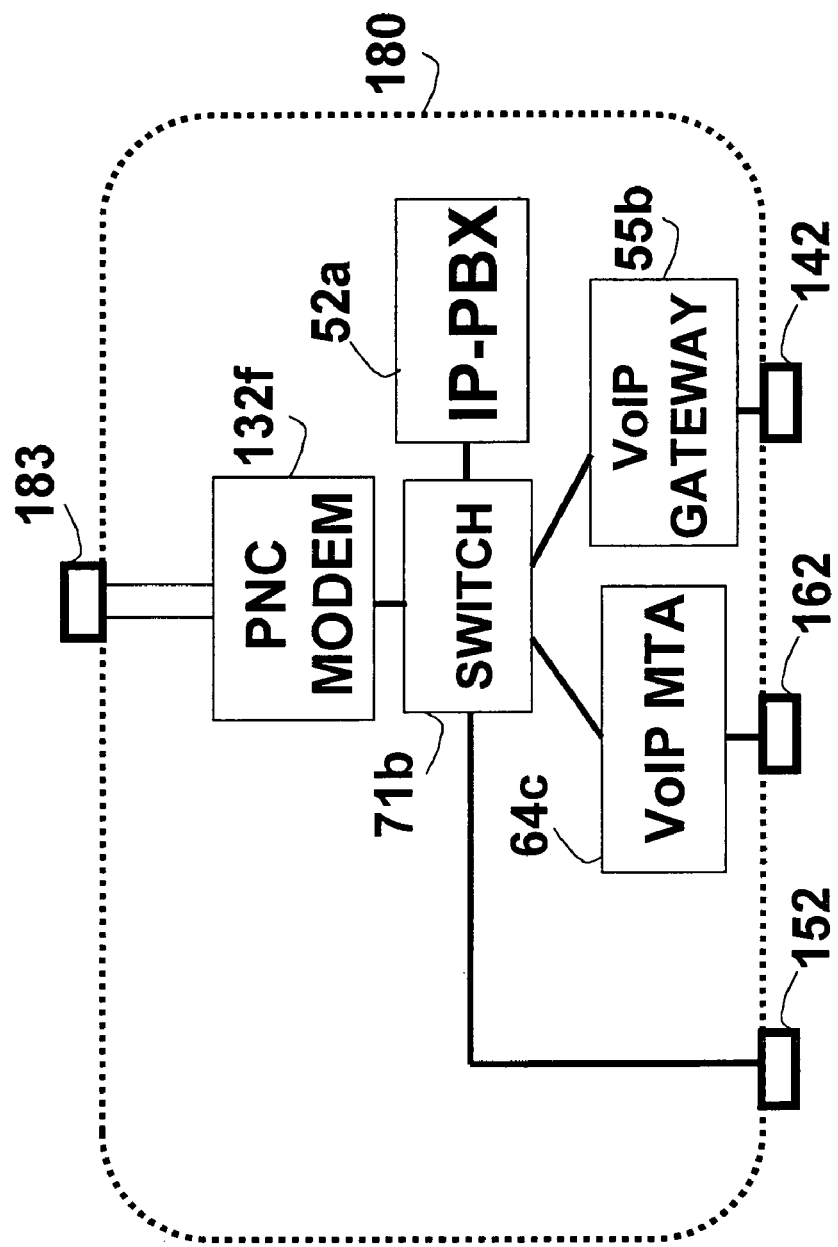
FIG. 18 shows a telephone outlet according to the present invention.

An outlet 180 comprising all above outlet functionalities is shown in FIG. 18. The outlet is coupled to the telephone wiring via connector 183, which connects to the switch 71b via PNC modem 132f. The outlet 180 provides three distinct ports. Port 142 serves for connection to incoming POTS telephone service, preferably via the CATV network 91, and is coupled to the switch 71b via VoIP gateway 55b. Port 162 serves for connection to a POTS telephone set 17, and is coupled to the switch 71b via VoIP MTA 64c. Port 152 constitutes a data connector that is directly connected to the switch 71b and allows for connection of an IP telephone 54. In addition, the outlet 180 comprises an IP-PBX functionality 52a.

Figure 18A:
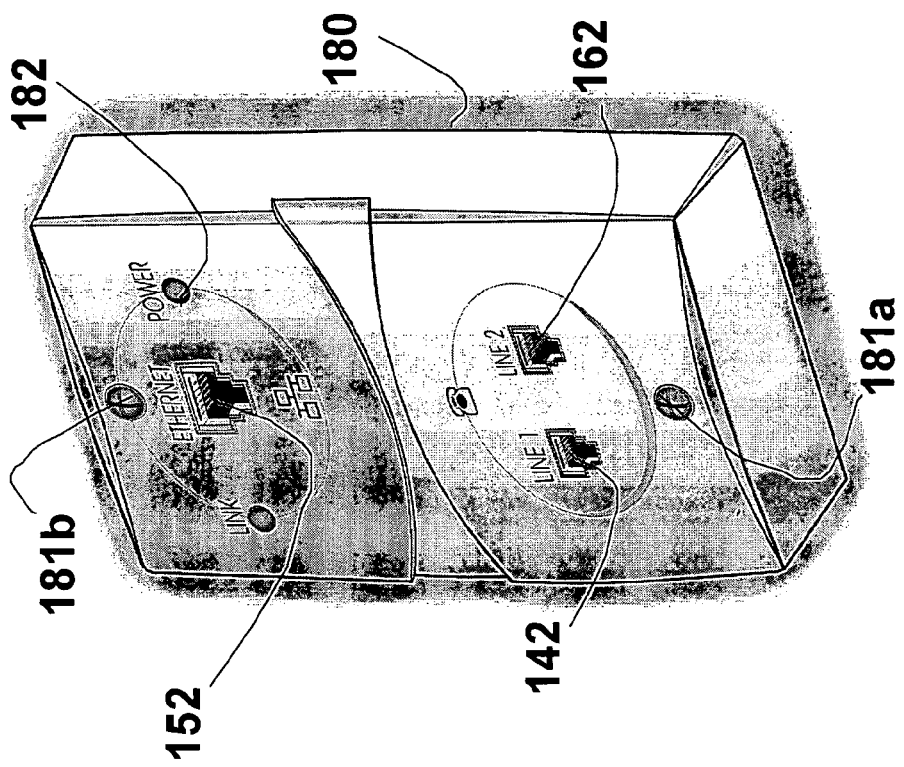
FIG. 18a shows a pictorial view of an outlet according to the present invention.

A pictorial view of a telephone outlet 180 is shown in FIG. 18a. The general shape of the enclosure of the outlet fits as a substitute for existing telephone outlets in North-America, and uses screws 181a and 181b to fasten the outlet to a wall fixture. A RJ-45 connector, commonly used for 10/100 BaseT IEEE802.3 interfaces, is used as port 152, and RJ-11 jacks, commonly used for POTS telephony, are used for ports 142 and 162.

Figure 19:
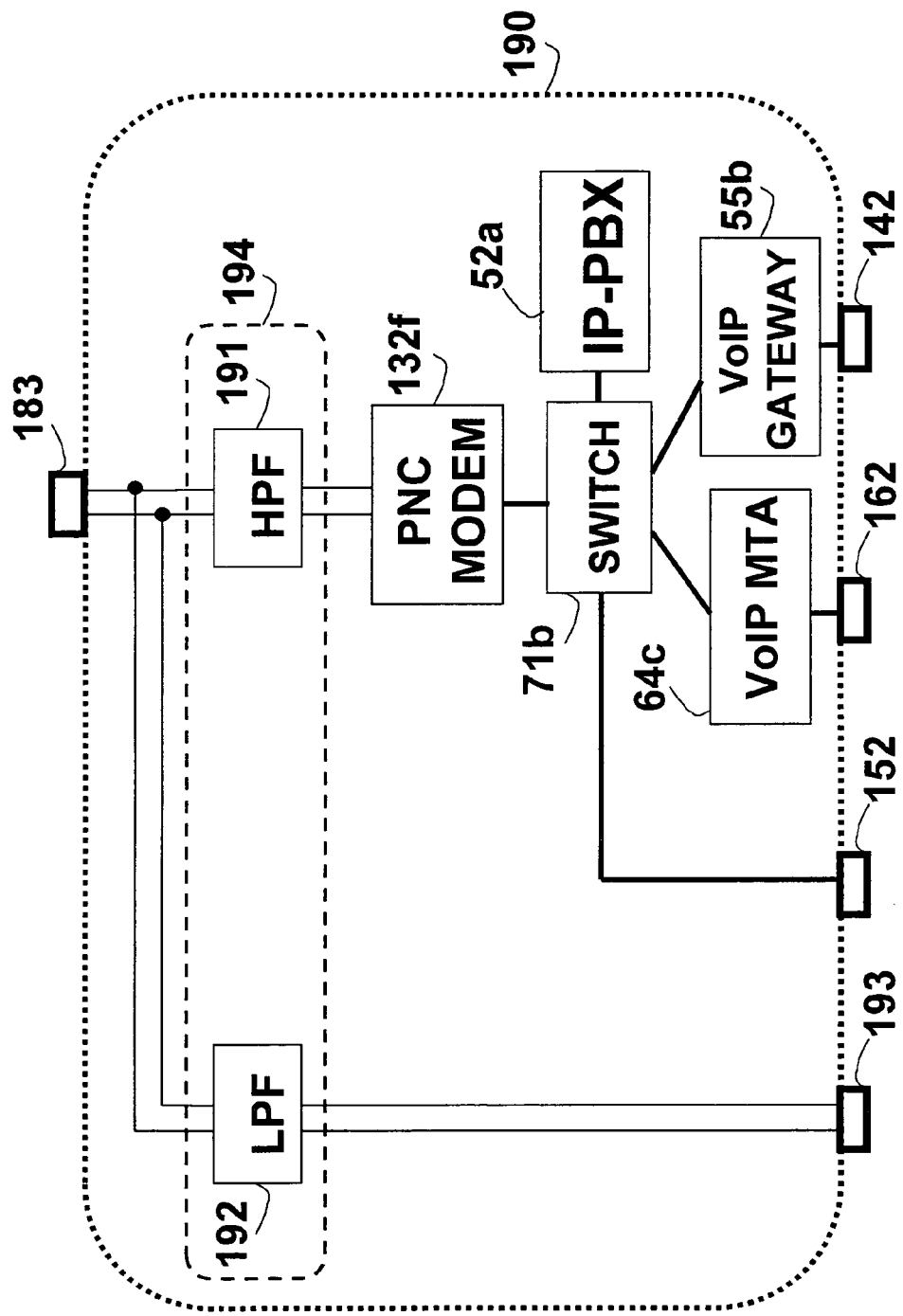
FIG. 19 shows a telephone outlet according to the present invention further allowing for non-IP telephone connection.

As explained above, the telephone wire pair can also be used to carry analog POTS telephone in the lower part of the frequency spectrum, in addition to serving as a medium for the data network. Outlet 180 described above does not provide any access to such POTS signal. In order to couple to this signal, outlet 180 should be modified to outlet 190 shown in FIG. 19. Such an outlet 190 comprises all the functions of outlet 180. However, the PNC modem 132f is not directly connected to the telephone wire pair via port 183, but rather via a high pass filter (BPF) 191, allowing passing of a signals above the POTS telephony spectrum. A low pass filter (LPF) 192 is added, also connected to the telephone wiring port 183. Such LPF 192 allows only the POTS telephony signal to pass through to port 193. In a basic embodiment, HPF 191 is implemented as an in-series capacitor and LPF 192 is implemented as an in-series connected inductor. This set 194 of filters HPF 191 and LPF 192 serves as coupling unit and is known to allow carrying of both POTS telephony and digital data signals over the telephone wire pair. A POTS telephone set 17 can be connected to the POTS telephone service via port 193. Furthermore, the POTS connection can be used for 'life-line' using switches (relays) known in the art, which routes the POTS signal into port 162 in the case of power outage or any other lack of telephone service availability through port 162.

In the case wherein the medium used for data networking is other than telephone wiring, the PNC modem 132f, the coupling unit 194 and the connector 193 should be modified accordingly. For example, in the case of powerline as the networking medium, the PNC modem 132f should be substituted with PLC modem 82 and the filters in the coupling unit 194 should be modified to pass the power mains (60 Hz in North America, 50 Hz in Europe) to a power socket that replaces the telephone connector 193. Similarly, the HPF 191 should be substituted with HPF operative to pass the data signals but block the power mains signal. In the case of coaxial cable medium, other set of filters (such as Band Pass Filter BPF) may be used.

Figure 20:
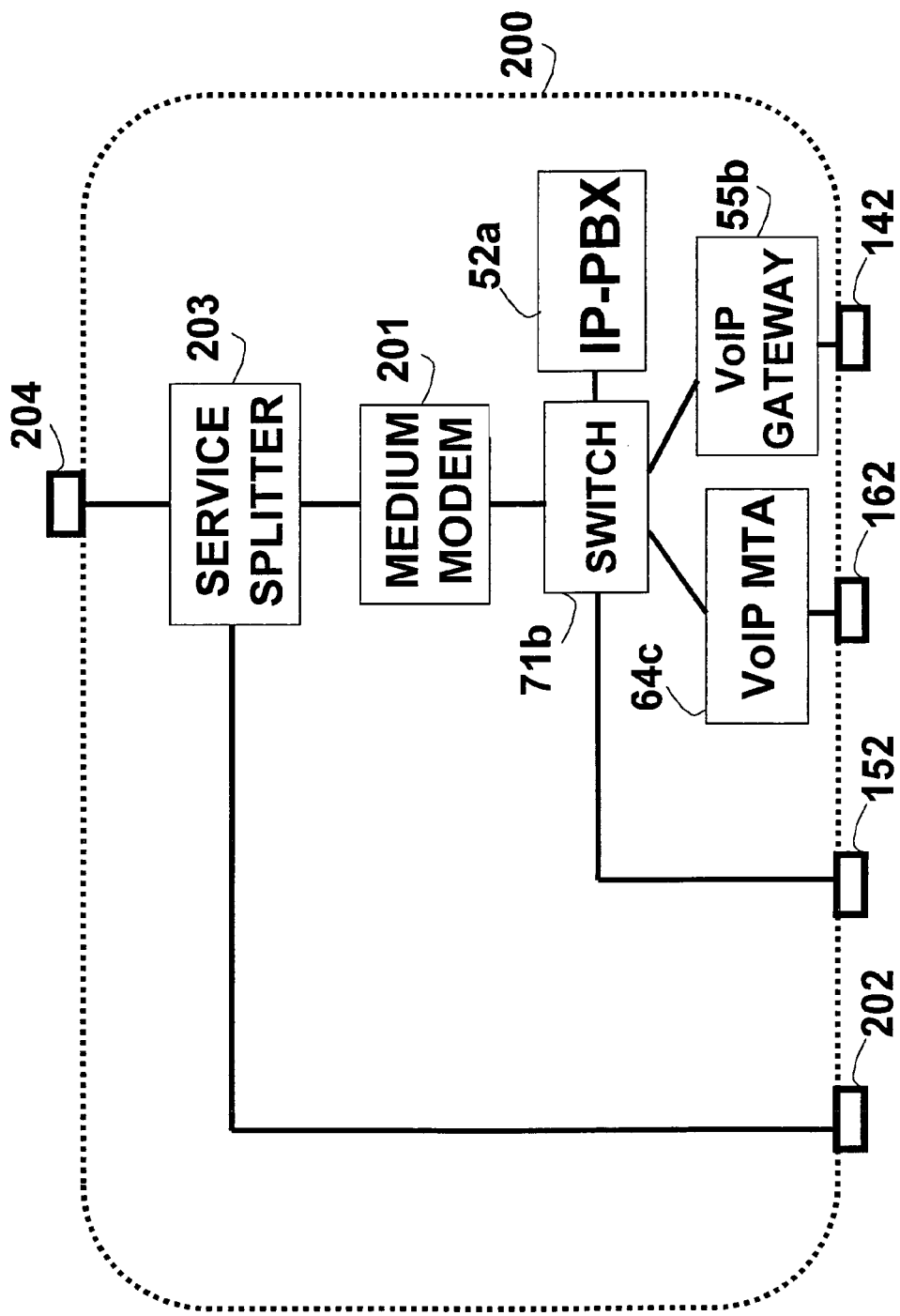
FIG. 20 shows a general outlet according to the present invention.

A general schematic structure of an outlet 200 supporting dual service wiring is shown in FIG. 20, coupled to a wiring via port 204. The regular service signal, being POTS telephony, mains power, CATV or any other signal is conveyed via the service splitter 203 to the standard service socket 202, being telephone, power or CATV connected respectively. A modem 201 adapted for use with the medium of choice (e.g. PNC modem 132f) supports transmission over the wiring, and is coupled to the wiring connection 204 (e.g. in-wall telephone wiring connection 183) via the service splitter 203 (e.g. coupling unit 194). The service splitter 203 is operative to allow the two signals to be conveyed over the wiring with minimum interference with each other. While the above outlet description related to existing in-home wiring, the invention can be equally applied to 'structured-wiring' networks such as network 110 of FIG. 11. In such a configuration, outlet 72 will be modified to comprise VoIP gateway 55b. In addition, VoIP MTA 64, switch 71 (if required) and IP-PBX 52 functionalities can also be integrated into the outlet. In general, outlet 180 applies to such a configuration with the exception of obviating the need for PNC modem 132f, since the wiring can be directly connected to the in-outlet switch.

Cellular

Figure 21:
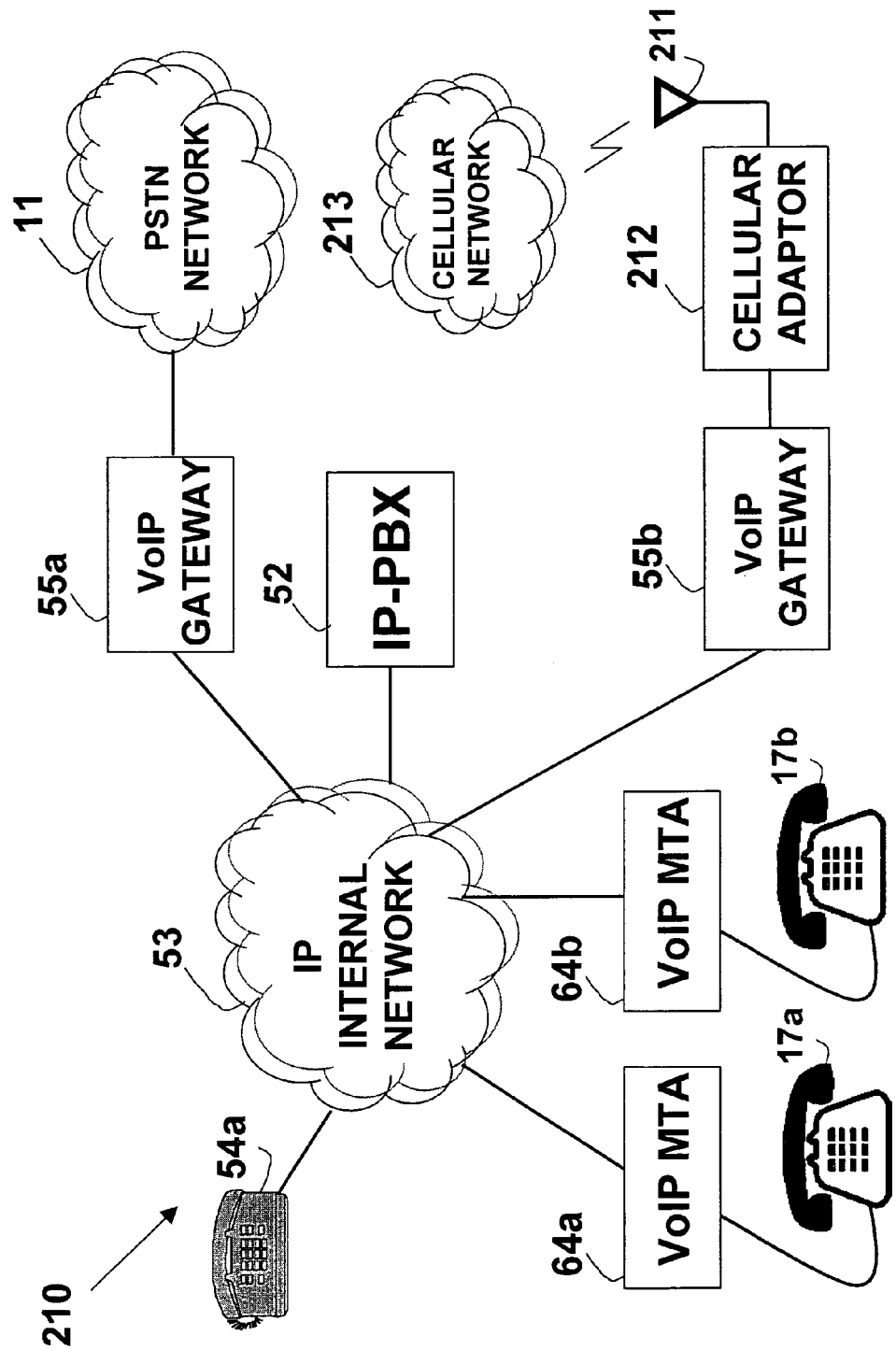
FIG. 21 shows a general VoIP network according to the present invention connected to PSTN and cellular networks.

The system 100 in FIG. 10 according to the invention involves external telephone line originated via CATV network 91. However, it is apparent that the invention equally applies to any telephone line connection to premises, either terrestrial or via the air. The cellular network in known to carry telephone calls over the air to cellular telephones. As such, the cellular network can also be the originating network of the telephone line, as shown in FIG. 21 describing network 210 as a substitute to the CATV network 91 of system 100 the cellular network 213 is used. The coupling to such a network 213 usually requires antenna 211, connected to a cellular adapter 212. Such adapters are known in the art to provide POTS telephone line originated by the cellular network 213. This POTS telephone line is converted to digital by the VoIP Gateway 55b and connects to the network 53. Other non-limiting examples of non-wired networks can be based on infrared and Radio Frequency, such as IEEE802.11, LMDS, MMDS, satellite or Bluetooth.

Figure 22:
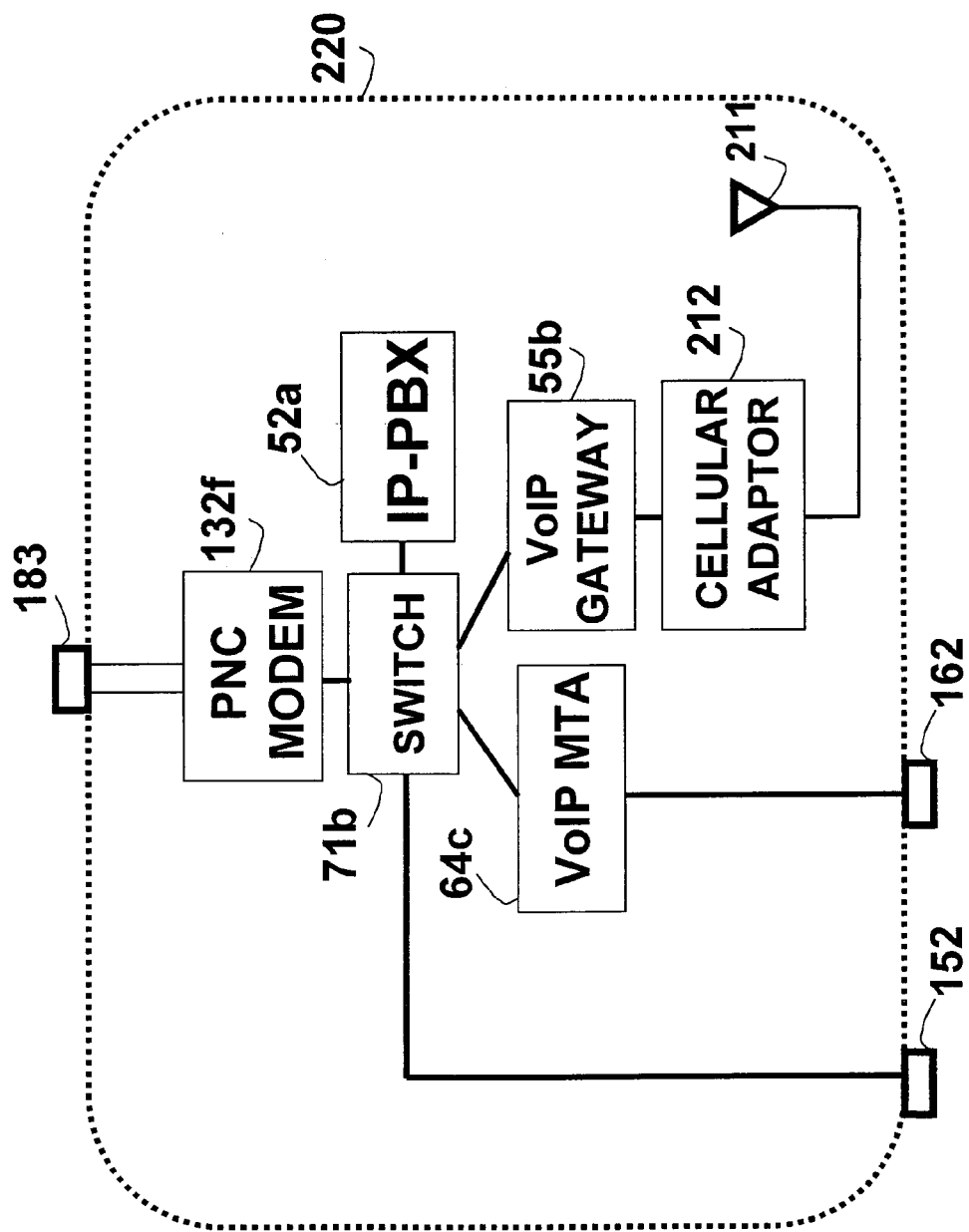
FIG. 22 shows a telephone outlet according to the present invention comprising cellular adapter.

In general, any of the outlets described above equally applies to such scenario, just by coupling the cellular adapter 212 to port 142 of the relevant outlet. However, in such case it will be appreciated that there is benefit in integrating the cellular adapter 212 and the antenna 211 into the outlet, obviating the need for external and stand-alone devices. Such outlet 220 is shown in FIG. 22.

Figure 23:
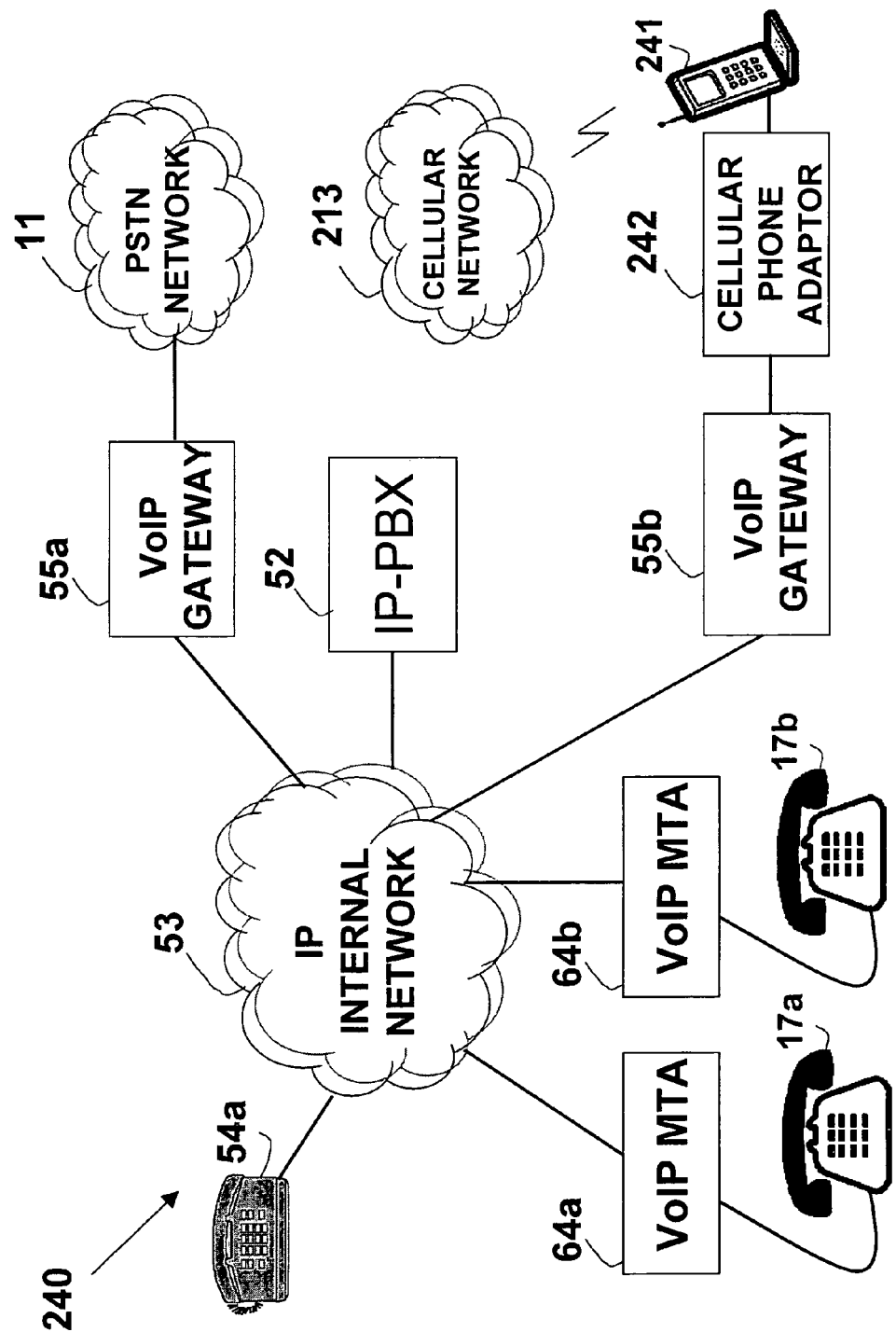
FIG. 23 shows a general VoIP network according to the present invention connected to the cellular network via cellular telephone.

As an alternative to the cellular adapter 212 and the antenna 211, a standard cellular telephone 241 together with known in the art cellular phone adapter 242 can be used in order to access the cellular network, as shown in network 240 in FIG. 23. An example of cellular phone adapter 242 is CellSocket™ from WHP Wireless, Inc. of Melville, New-York, USA.

Figure 24:
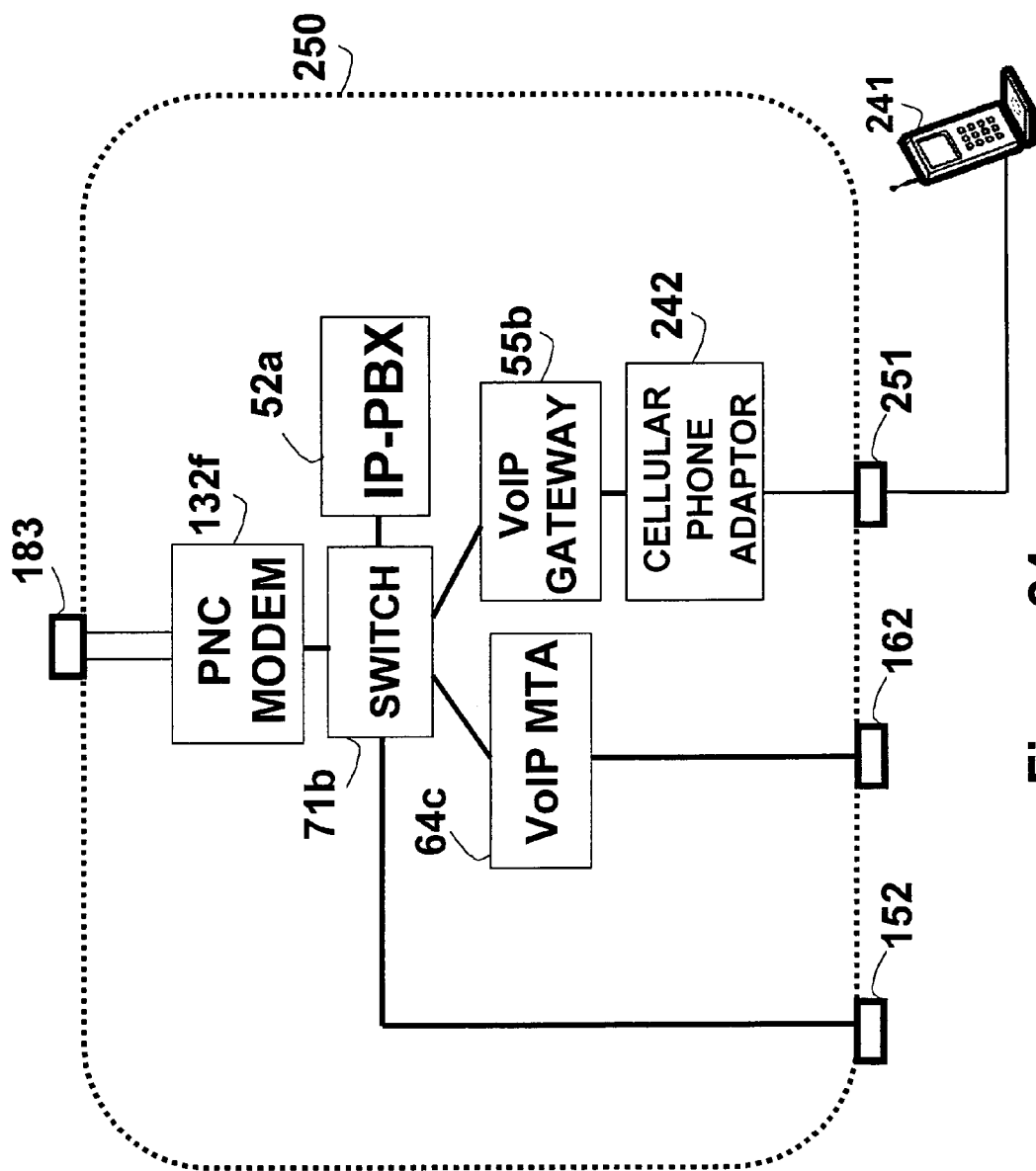
FIG. 24 shows a telephone outlet according to the present invention comprising cellular phone adapter.
Figure 25A:
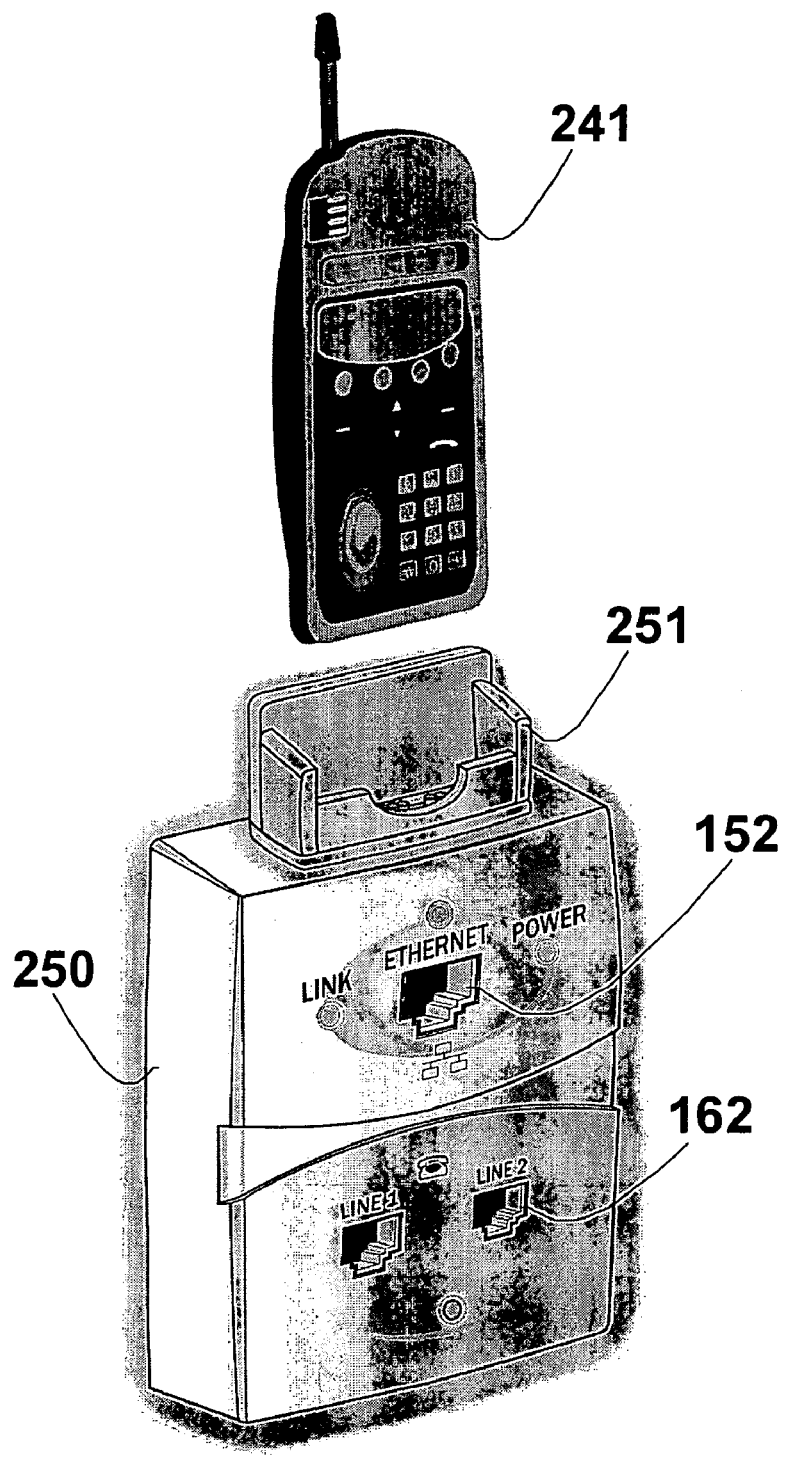
FIG. 25a shows a pictorial view of an outlet according to the present invention having cellular telephone adapter and detached cellular telephone.
Figure 25B:
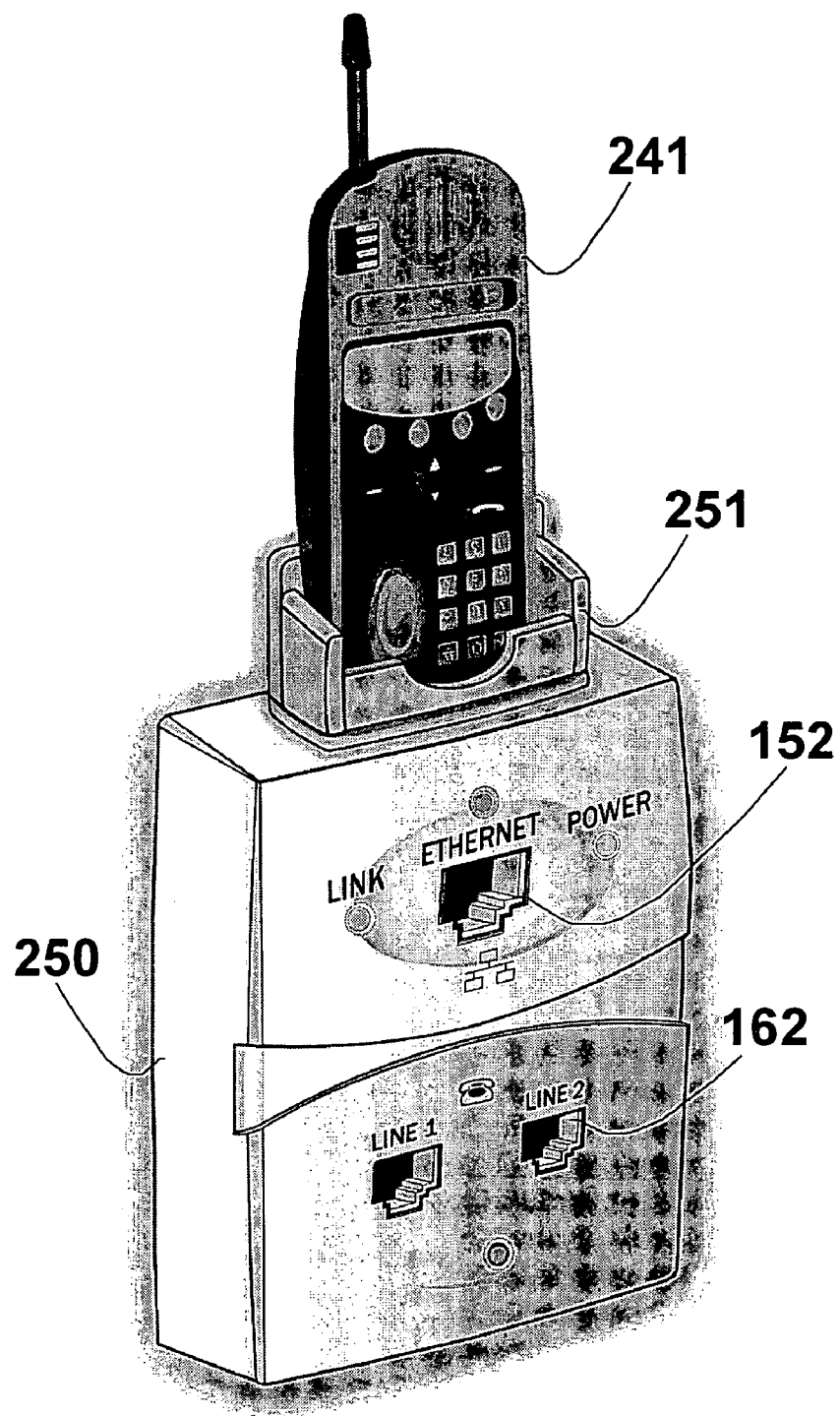
FIG. 25b shows a pictorial view of an outlet according to the present invention having cellular telephone adapter and cellular telephone attached thereto.

In another embodiment of the present invention referring to network 240, the outlet 250 shown in FIG. 24 comprises the cellular phone adapter 242, and provides a port 251 for connection to the cellular telephone 241. While the connection between the telephone 241 and port 251 of outlet 250 can use a cable, in a preferred embodiment the cellular telephone 241 can plug-in both mechanically and electronically to an outlet. This configuration, shown in FIG. 24, allows for the cellular telephone 241 user to choose between either carrying it and utilizing its mobility or plugging it into the outlet. In the latter case, an incoming telephone call can be routed via the network 53 to one or more of the non-mobile telephone sets connected to the network. A pictorial view of outlet 250 is shown in FIGS. 25a and 25b. The outlet 250 shown is based on outlet 180 shown in FIG. 18a, wherein a cradle adapter 251 is added, comprising a mechanical cradle adapter and electrical connector for housing, securing and connecting to cellular telephone 241 shown. FIG. 25a shows the cellular telephone 241 detached from the outlet 250, while FIG. 25b shows the cellular telephone 241 inserted into the outlet 250.

Although the invention has been so far described as relating to Ethernet/IP-based home networking, the invention can be similarly applied to any type of data network. Furthermore, although packet networks are the most common for local area networks and wide area networks, the invention is not restricted to packet networks only, and can be applied to any digital data network, where network entities are identified uniquely by addresses.

Furthermore, although the invention has been described as relating to networks based on continuous electrical conducting medium (telephone, CATV, or electrical power), and the relevant modem and associated circuitry are connected in parallel to the wiring infrastructure, the invention can be applied equally to the case wherein the wiring is not continuous, but is in discrete segments. Such an arrangement is disclosed in WO 0007322 published Feb. 10, 2000 and entitled "Local Area Network of Serial Intelligent Cells" in the name of the present inventor and assigned to the present assignee, which is incorporated by reference for all purposes as if fully set forth herein.

While the invention has been described with respect to a home network, it will be appreciated that the invention equally applies to any in-house network connected to an external network. Local area networks (LAN) within offices, factories or enterprises can equally use the invention.

While the invention has been described with respect to a limited number of embodiments, it will be appreciated that many variations, modifications, derivatives, combinations and other applications of the invention may be made.

What is claimed is:

1. A system in a building for connecting a telephone set to an Internet Protocol (IP)-based telephone network other than a Public Switched Telephone Network (PSTN) via a home network, for use with a PSTN suitable for providing Plain Old Telephone Service (POTS) service, the PSTN being operated by a first telephone service provider and comprising a local loop, and an IP-Based telephone service network external to the building for carrying Voice over IP (VoIP) packets and operated by a second telephone service provider different from said first telephone service provider, said system comprising:
a telephone wire pair that forms a part of the home network and that is at least in part in walls of the building, connected to the local-loop and accessible at an outlet opening, said telephone wire pair being connected for carrying a digital data signal in a digital data frequency band that is distinct from, and higher than, a voice band, the digital data signal containing one or more digitized telephone signals;
a gateway connected to said telephone wire pair at a first connection point, said gateway being couplable to the PSTN and to the IP-Based telephone service network, said gateway being operative to pass the one or more digitized telephone signals between the IP-Based telephone service network and said telephone wire pair; and
a first adapter housed in a single enclosure connected to said telephone wire pair at a second connection point distinct from said first connection point and connectable to a first telephone set, said first adapter being operative for converting between analog and digital telephone signals and to couple a first digitized telephone signal carried over said telephone wire pair to the first telephone set.

2. The system according to claim 1, wherein said telephone wire pair is further connected to the PSTN to concurrently carrying a POTS signal using frequency division multiplexing (FDM), and wherein said first adapter is further operative to connect the POTS signal to the first telephone set or another telephone set for telephone service by the first telephone service provider.

3. The system according to claim 1, further comprising a second adaptor connected to said telephone wire pair at a third connection point distinct from said first and second connection points and connectable to a second telephone set, said second adapter being operative for converting between analog and digital telephone signals, and said second adapter being operative to couple a digitized telephone signal carried over said telephone wire pair to the second telephone set.

4. The system according to claim 1, wherein said telephone wire pair is connected to further carry a second digitized telephone signal, and said first adapter is further operative to couple the second digitized telephone signal carried over said telephone wire pair to the second telephone set.

5. The system according to claim 1, wherein the digital data signal to be carried over said telephone wire pair substantially conforms to Home Phoneline Networking Alliance (HomePNA) specifications.

6. The system according to claim 1, wherein the local loop is connected for carrying a Digital Subscriber Loop (DSL) signal.

7. The system according to claim 6, wherein the DSL signal is an ADSL signal.

8. The system according to claim 1, wherein the IP-Based telephone service network is concurrently a cable television (CATV) network for delivering video and comprises coaxial cabling.

9. The system according to claim 1, wherein the IP-Based telephone service network is connected to conduct communications via satellite.

10. The system according to claim 1, wherein the IP-Based telephone service network is connected to conduct communications over power lines.

11. The system according to claim 1, wherein the IP-Based telephone service network is connected to conduct over-the-air communications with radio frequency signals.

12. The system according to claim 11, wherein the IP-Based telephone service network is based on one of the following protocols: cellular; LMDS; MMDS; IEEE802.11; and Bluetooth.

13. The system according to claim 1, wherein the IP-Based telephone service network is connected to conduct communications over fibers.

14. The system according to claim 13, wherein the IP-Based telephone service network is connected to conduct communications based on Fiber To The Home (FTTH) technology.

15. The system according to claim 1, wherein the IP-based telephone network or the telephone service provided by the second telephone service provider is based on one or more of: Session Initiation Protocol (SIP); IETF RFC 3261; Media Gateway Control Protocol (MGCP); ITU-T H.323; IETF RFC 2705; or any variant thereof.

16. The system according to claim 1, wherein said system is further connectable to multiple telephone sets, and said system further provides an IP-PBX functionality for routing telephone calls between all connected telephone sets and all external telephone service connections.

17. The system according to claim 1, wherein said telephone wire pair is further connected to the PSTN to concurrently carry a POTS signal, and said gateway is further operative to convert between a digitized telephone signal carried over the IP-Based telephone service network and a POTS signal, and to couple the POTS signal to said telephone wire pair.

18. The system according to claim 1 wherein said single enclosure is mountable into an outlet cavity or an outlet opening.

19. The system according to claim 1, wherein said single enclosure is constructed to have at least one of the following:
 a form substantially similar to that of a standard telephone outlet;
 wall mounting elements substantially similar to those of a standard telephone wall outlet;
 a shape allowing direct mounting in a telephone outlet opening or cavity; and
 a form to at least in part substitute for a standard telephone outlet.

20. The system according to claim 1, wherein said first adapter is pluggable into an existing telephone outlet.

21. A system for connecting a telephone set in a building to multiple Internet Protocol (IP)-based telephone networks external to the building via a home network, said system comprising:
 a first IP-Based telephone service network external to the building and connected for carrying at least a first digitized telephone signal in a Voice over IP (VoIP) packet form and operated by a first telephone service provider;
 a second distinct IP-Based telephone service network external to the building and connected for carrying at least a second digitized telephone signal in a Voice over IP (VoIP) packet form and operated by a second telephone service provider different from said first telephone service provider;
 a telephone wire pair that forms a part of the home network and that is at least in part in walls of the building, and accessible at an outlet opening, the telephone wire pair being coupled to said first and second IP-Based telephone service networks for concurrently respectively carrying the first and second digitized telephone signals, said telephone wire pair being connected for carrying a digital data signal in a digital data frequency band that is distinct from, and higher than, a voice band; and
 a first adapter housed in a single enclosure and connected to said telephone wire pair and connectable to a first telephone set, said first adapter being operative for converting between analog and digitized telephone signals, and being operative to couple the first digitized telephone signal carried over said telephone wire pair to the first telephone set and to couple the second digitized telephone signal carried over said telephone wire pair to the first telephone set.

22. The system according to claim 21, further comprising a gateway housed in a second single enclosure and connected to said telephone wire pair at a first connection point, said gateway being coupled and to said first and second IP-Based telephone service networks, said gateway being operative to pass the first and second digitized telephone signals between the IP-Based telephone service networks and said telephone wire pair.

23. The system according to claim 22, wherein said telephone wire pair is further connected to a PSTN to concurrently carry a POTS signal, and said gateway is further operative to convert between a digitized telephone signal carried over the first IP-Based telephone service network and a POTS signal, and to couple the POTS signal to said telephone wire pair.

24. The system according to claim 21, wherein said telephone wire pair is further connected to a PSTN to concurrently carry a POTS signal using frequency division multiplexing (FDM), and wherein said first adapter is further operative to connect the POTS signal to the first telephone set or another telephone set for telephone service by the first or second telephone service provider.

25. The system according to claim 21, further comprising a second adaptor connected to said telephone wire pair and connectable to a second telephone set, said second adapter being operative for converting between analog and digital telephone signals and to couple the second digitized telephone signal carried over said telephone wire pair to the second telephone set.

26. The system according to claim 21, wherein the digital data signal to be carried over said telephone wire pair substantially conforms to Home Phoneline Networking Alliance (HomePNA) specifications.

27. The system according to claim 21, wherein one of said first and second IP-Based telephone service networks connects to the building over a local loop that is connected for carrying a Digital Subscriber Loop (DSL) signal.

28. The system according to claim 27, wherein the DSL signal is an ADSL signal.

29. The system according to claim 21, wherein at least one of said first and second IP-Based telephone service networks is concurrently a cable television (CATV) network for delivering video and comprises coaxial cabling.

30. The system according to claim 21, wherein at least one of said first and second IP-Based telephone service networks is connected to conduct communications via satellite.

31. The system according to claim 21, wherein at least one of said first and second IP-Based telephone service networks is connected to conduct communications over power lines.

32. The system according to claim 21, wherein at least one of said first and second IP-Based telephone service networks is connected to conduct communications with radio frequency signals.

33. The system according to claim 32, wherein said at least one of said IP-Based telephone service networks is based on one of the following protocols: cellular; LMDS; MMDS; IEEE802.11; and Bluetooth.

34. The system according to claim 21, wherein at least one of said first and second IP-Based telephone service networks is connected to conduct communications over fibers.

35. The system according to claim 34, wherein said at least one of said IP-Based telephone service networks is connected to conduct communications based on Fiber To The Home (FTTH) technology.

36. The system according to claim 21, wherein at least one of the first and second digitized telephone signals is based on one or more of: Session Initiation Protocol (SIP); IETF RFC 3261; Media Gateway Control Protocol (MGCP); ITU-T H.323; IETF RFC 2705; or any variant thereof.

37. The system according to claim 21, wherein said system is further connectable to multiple telephone sets, and said system further provides an IP-PBX functionality for routing telephone calls between all connected telephone sets and all external telephone service connections.

38. The system according to claim 21 wherein said single enclosure is mountable into an outlet cavity or an outlet opening.

39. The system according to claim 21, wherein said single enclosure is constructed to have at least one of the following:

a form substantially similar to that of a standard telephone outlet;

wall mounting elements substantially similar to those of a standard telephone wall outlet;

a shape allowing direct mounting in a telephone outlet opening or cavity; and a form to at least in part substitute for a standard telephone outlet.

40. The system according to claim 21, wherein said first adapter is pluggable into an existing telephone outlet.

* * * * *